(12) United States Patent
Cao et al.

(10) Patent No.: US 9,779,161 B2
(45) Date of Patent: *Oct. 3, 2017

(54) VISUALIZING CONFLICTS IN ONLINE MESSAGES

(71) Applicant: International Business Machines Corporation, Armonk, NY (US)

(72) Inventors: Nan Cao, Ossining, NY (US); Ching-Yung Lin, Forest Hills, NY (US); Fei Wang, Ossining, NY (US); Zhen Wen, Springfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/994,456

(22) Filed: Jan. 13, 2016

(65) Prior Publication Data

US 2016/0125073 A1 May 5, 2016

Related U.S. Application Data

(63) Continuation of application No. 14/050,514, filed on Oct. 10, 2013, now Pat. No. 9,256,670.

(51) Int. Cl.
| | |
|---|---|
| *G06F 17/30* | (2006.01) |
| *G06Q 10/00* | (2012.01) |
| *H04L 12/58* | (2006.01) |

(52) U.S. Cl.
CPC .. *G06F 17/30684* (2013.01); *G06F 17/30696* (2013.01); *G06F 17/30716* (2013.01);
(Continued)

(58) Field of Classification Search
None
See application file for complete search history.

(56) References Cited

U.S. PATENT DOCUMENTS

| | | |
|---|---|---|
| 8,166,032 B2 | 4/2012 | Sommer et al. |
| 2006/0242040 A1 | 10/2006 | Rader |

(Continued)

FOREIGN PATENT DOCUMENTS

WO    2012117117 A1    9/2012

OTHER PUBLICATIONS

Tufte, "Posters and Graph Paper: Napoeon's March," http://www.edwardtufte.com/tufte/posters (1861 by Minard, 1983 by Tufte), and http://it.coe.uga.edu/studio/seminars/visualization/minard.html, accessed May 7, 2012, 5 pages.

(Continued)

*Primary Examiner* — Hung Q Pham
(74) *Attorney, Agent, or Firm* — Yee & Associates, P.C.; Daniel P. Morris

(57) ABSTRACT

Visualizing social media conflict is provided. Active users in a set of human users authoring a number of textual messages regarding a particular topic more than a threshold number of textual messages are selected. Keywords are selected that occur more than a threshold number of times within the textual messages regarding the particular topic. A sentiment score is computed for each of the keywords occurring more than the threshold number of times within the textual messages using a keyword co-occurrence graph. A sentiment of each of the active users is determined based on the computed sentiment score of each of the selected keywords that are authored by a particular active user. Two distinct groups from the active users are selected based on at least one of a relationship between the two distinct groups and a determined degree of conflict between the two distinct groups with regard to the particular topic.

20 Claims, 13 Drawing Sheets

(52) U.S. Cl.
CPC ....... *G06F 17/30867* (2013.01); *G06Q 10/00* (2013.01); *H04L 51/32* (2013.01)

(56) References Cited

U.S. PATENT DOCUMENTS

| | | |
|---|---|---|
| 2012/0330973 A1 | 12/2012 | Ghuneim et al. |
| 2013/0085897 A1 | 4/2013 | Favoretto |
| 2015/0106360 A1 | 4/2015 | Cao et al. |

OTHER PUBLICATIONS

Jo et al., "Aspect and Sentiment Unification Model for Online Review Analysis," Proceedings of the Fourth ACM International Conference on Web Search and Data Mining (WSDM'11), Feb. 2011, pp. 815-824.

Sanchez et al., "Towards mood-oriented interfaces for synchronous interaction," Proceedings of the 2005 Latin American Conference on Human-Computer Interaction (CLICH'05), Oct. 2005, 7 pages.

Kim, "A Hyperlink and Semantic Network Analysis of the Triple Helix (University-Government-Industry): The Interorganizational Communication Structure of Nanotechnology," Journal of Computer-Mediated Communication, vol. 17, No. 2, Jan. 2012, pp. 152-170.

Dork et al, "A Visual Backchannel for Large-Scale Events," IEEE Transactions on Visualization and Computer Graphics, vol. 16, No. 6, Nov./Dec. 2010, pp. 1129-1138.

Viegas et al, "Studying Cooperation and Conflict Between Authors with history flow Visualizations," Proceedings of the SIGCHI conference on Human Factors in Computing Systems (CHI'04), Apr. 2004, pp. 575-582.

Office Action, dated Jul. 16, 2015 regarding U.S. Appl. No. 14/040,514, 9 pages.

Notice of Allowance, dated Oct. 19, 2015, regarding U.S. Appl. No. 14/040,514, 7 pages.

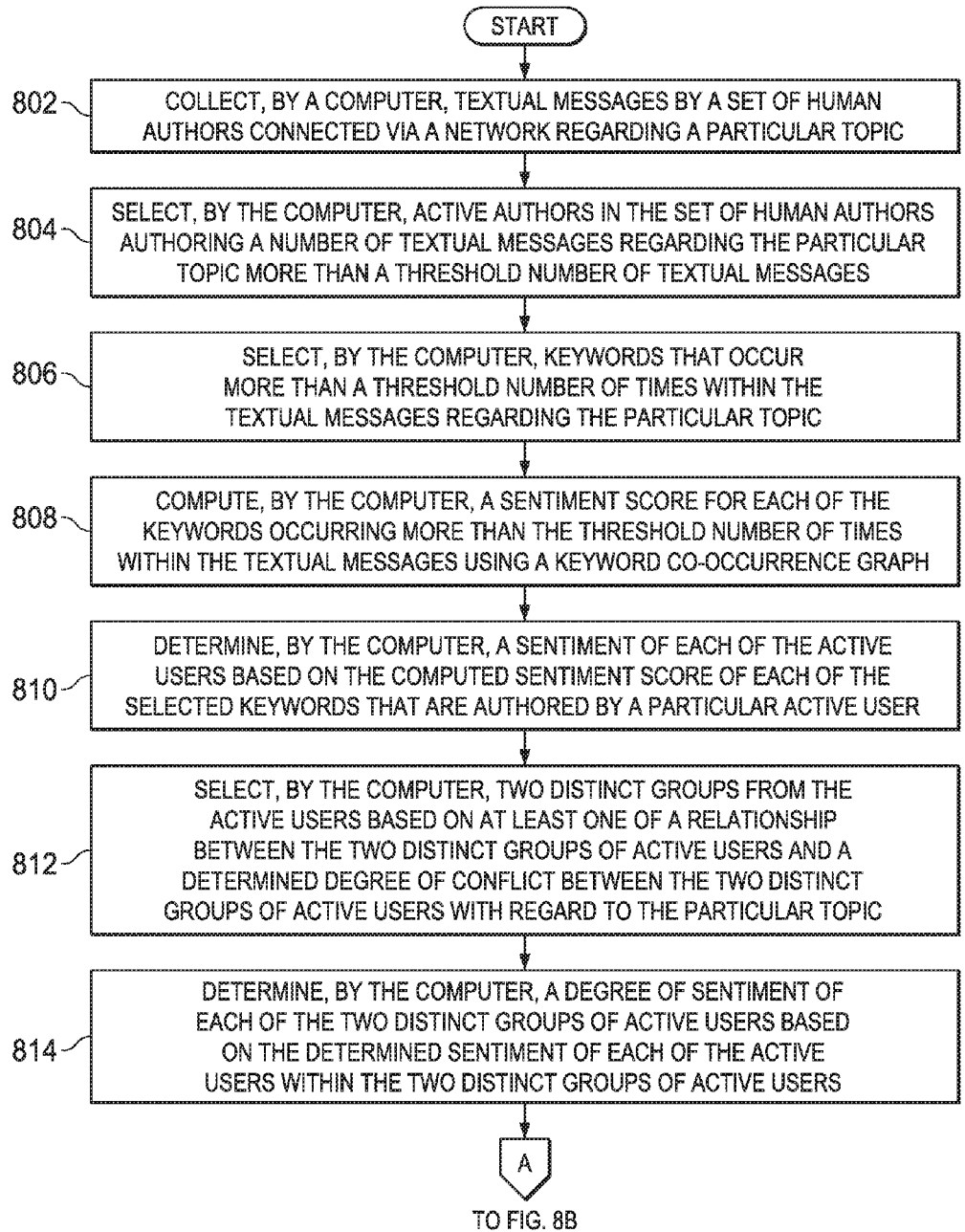

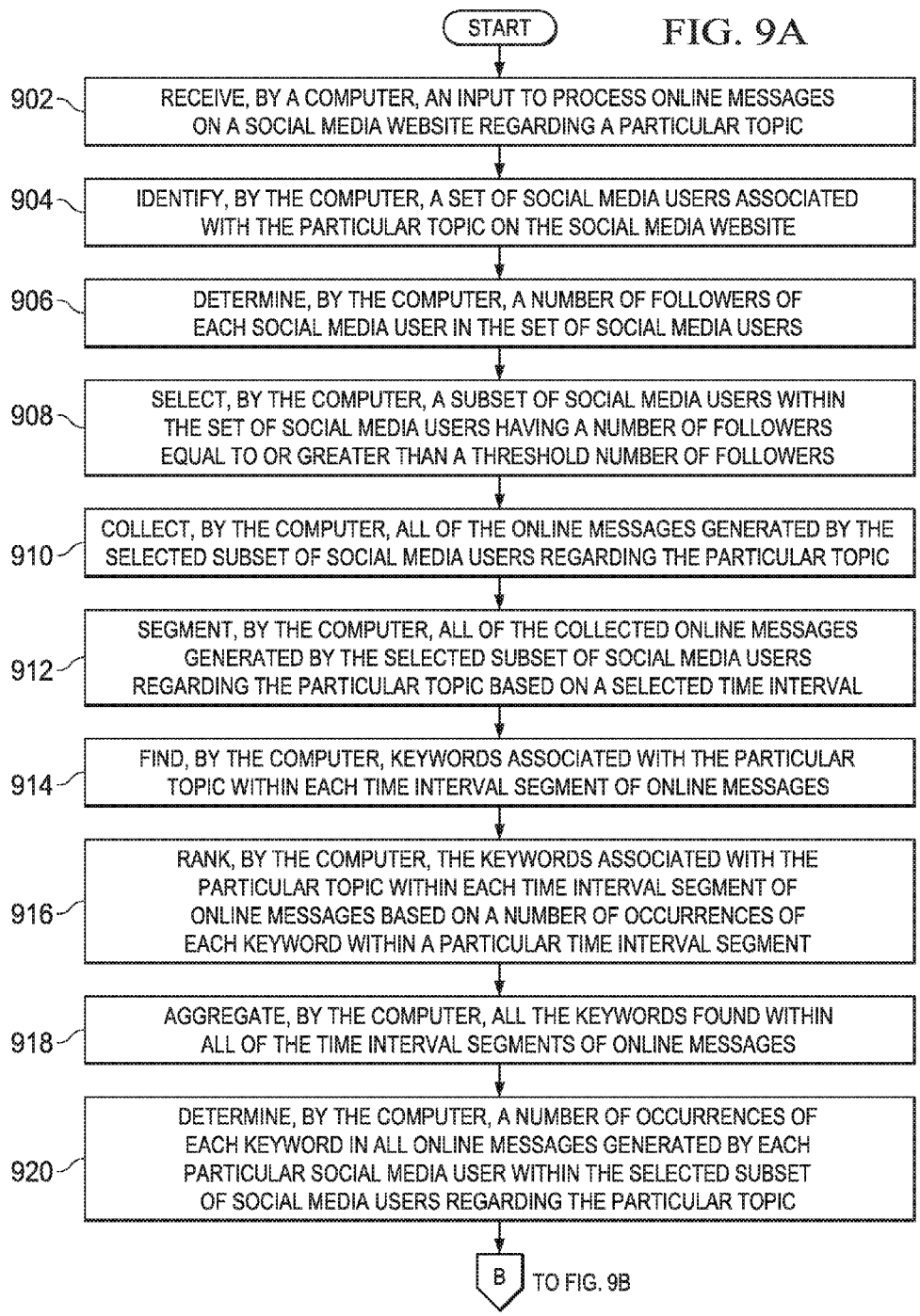

VISUALIZING CONFLICTS IN ONLINE MESSAGES

This application is a continuation of U.S. patent application Ser. No. 14/050,514 filed on Oct. 10, 2013.

BACKGROUND

1. Field

The disclosure relates generally to online messaging and more specifically to visualizing public conflicts contained within online messages posted by social media users on social media websites.

2. Description of the Related Art

The proliferation of online social media websites or forums has provided users with an ability to share their opinions and ideas at unprecedented speed. While social media users may propagate their opinions and ideas independently, public conflicts often occur when users hold opposite opinions and want to achieve incompatible goals. For example, during an election year, users supporting different political parties may fight via social media forums to advance their own political views. As another example, in social media marketing, different manufacturers of competing products may launch adversarial ad campaigns to win a larger market share of social media users.

In addition, some topics or events naturally provoke public conflicts and involve many social media users. For example, an election debate may trigger a series of public online conflicts because of the different political views being advanced by the candidates of the different political parties. On the social media websites, some users watching the debate will show their support by providing positive comments regarding their political party's candidate, while other users watching the debate will attack the opposing candidate with negative words and sentiments, which leads to heated online discussions on social media websites.

SUMMARY

According to one illustrative embodiment a computer-implemented method for visualizing social media conflict is provided. A computer selects active users in a set of human users authoring a number of textual messages regarding a particular topic more than a threshold number of textual messages. The computer selects keywords that occur more than a threshold number of times within the textual messages regarding the particular topic. The computer computes a sentiment score for each of the keywords occurring more than the threshold number of times within the textual messages using a keyword co-occurrence graph. The computer determines a sentiment of each of the active users based on the computed sentiment score of each of the selected keywords that are authored by a particular active user. The computer selects two distinct groups from the active users based on at least one of a relationship between the two distinct groups of active users and a determined degree of conflict between the two distinct groups of active users with regard to the particular topic. The computer determines a degree of sentiment of each of the two distinct groups of active users based on the determined sentiment of each of the active users within the two distinct groups of active users. The computer computes a degree of polarity between the two distinct groups of active users based on the determined sentiment of each of the active users within each of the two distinct groups of active users. The computer displays a graph of the degree of sentiment of each of the two distinct groups of active users and the degree of polarity between the two distinct groups of active users. According to other illustrative embodiments, a computer system and a computer program product for visualizing social media conflict are provided.

BRIEF DESCRIPTION OF THE SEVERAL VIEWS OF THE DRAWINGS

FIGS. 8A-8B are a flowchart illustrating a process for visualizing social media conflict with regard to a particular topic in accordance with an illustrative embodiment;

FIGS. 9A-9B are a flowchart illustrating a process for processing online messages in accordance with an illustrative embodiment.

DETAILED DESCRIPTION

Figure 1:
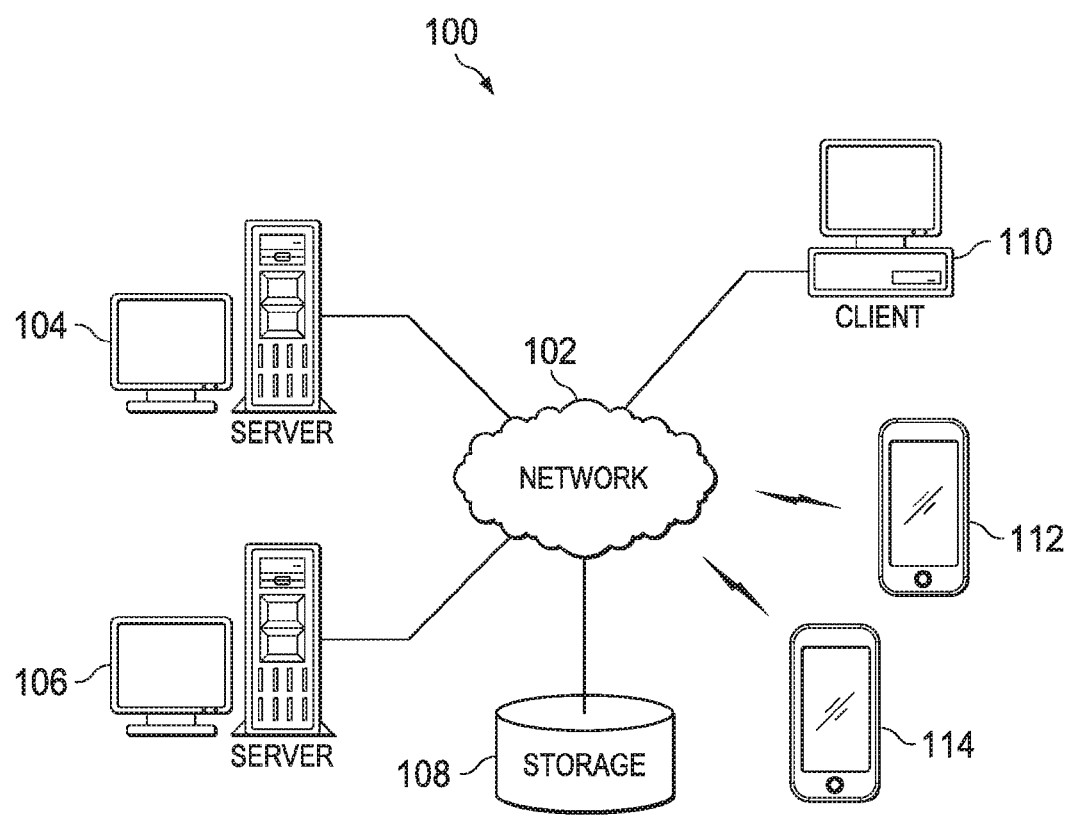
FIG. 1 is a pictorial representation of a network of data processing systems in which illustrative embodiments may be implemented.

As will be appreciated by one skilled in the art, aspects of the illustrative embodiments may be embodied as a computer system or computer program product. Accordingly, aspects of the illustrative embodiments may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of computer systems and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
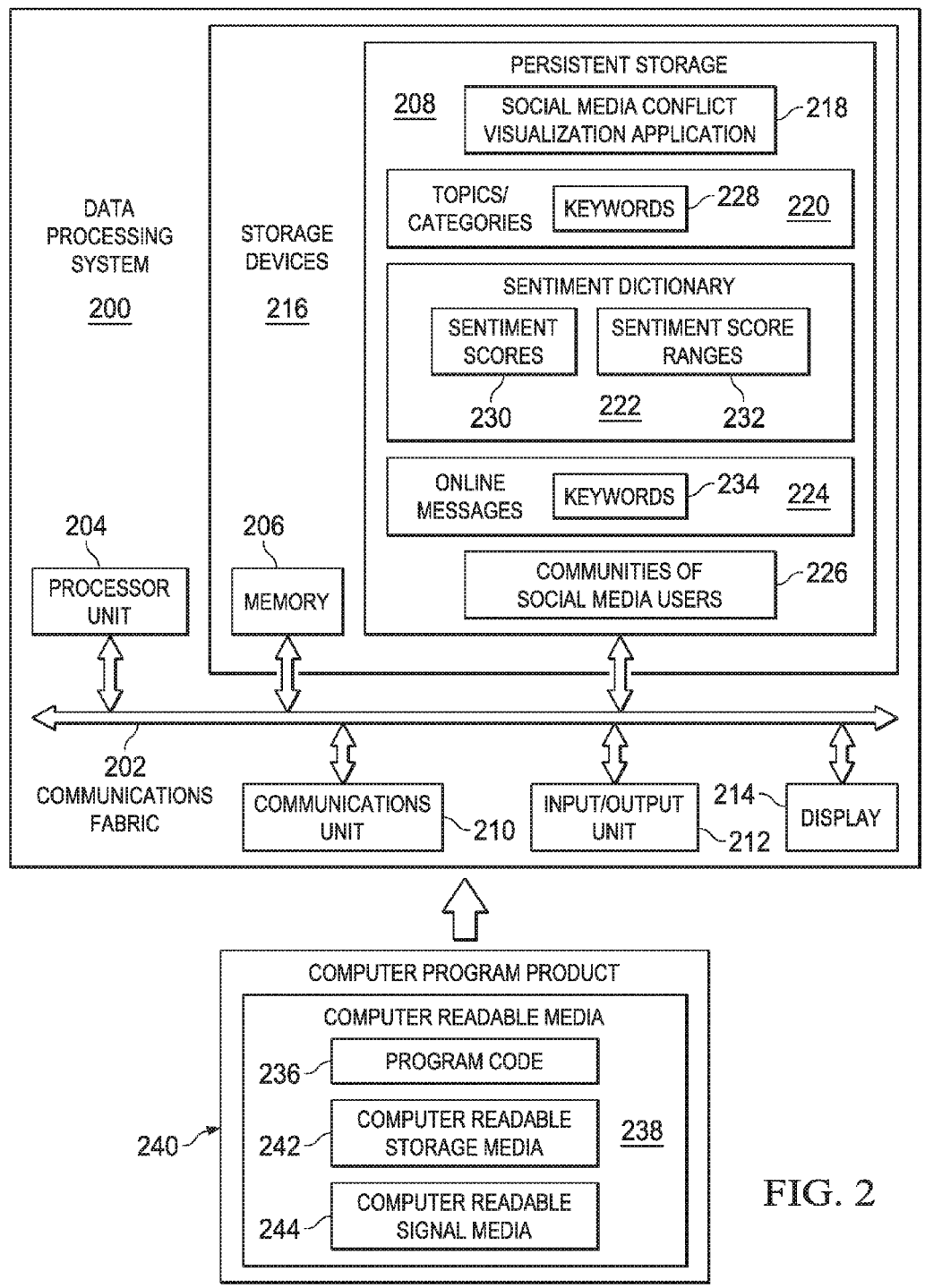
FIG. 2 is a diagram of a data processing system in which illustrative embodiments may be implemented.
Figure 3:
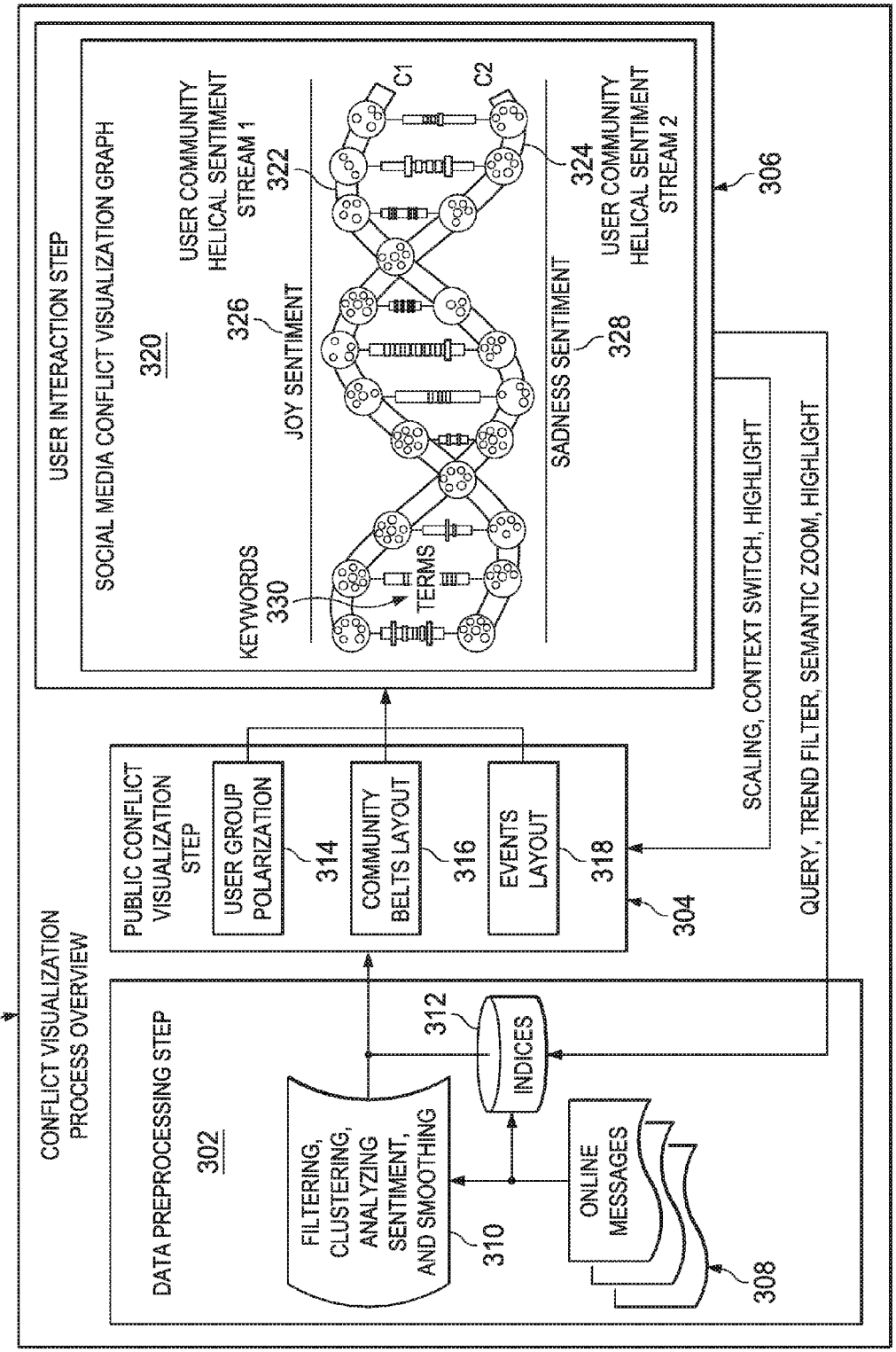
FIG. 3 is a diagram of a conflict visualization process overview in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other data processing devices in which the illustrative embodiments may be implemented. Network data processing system 100 contains network 102, which is the medium used to provide communications links between the computers and the other data processing devices connected together within network data processing system 100. Network 102 may include connections, such as wire communication links, wireless communication links, or fiber optic cables.

In the depicted example, server 104 and server 106 connect to network 102, along with storage 108. Server 104 and server 106 may be, for example, server computers with high-speed connections to network 102. In addition, server 104 and/or server 106 may provide services to applications located on client devices connected to network 102. For example, server 104 may provide social media services to associated applications running on client devices. Also, server 106 may provide services to client devices that generate visualizations of public conflicts contained within online messages posted by social media users on social media websites. The online messages may include, for example, text messages, instant messages, e-mail messages, short message system (SMS) messages, web logs (blogs), microblogs, online chat room messages, or any other type of network messaging in text format. Further, the online messages also may include audio messages and video messages. Server 106 may utilize, for example, a speech-to-text converter to convert the audio and video messages into a textual format.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114. Users of clients 110, 112, and 114 utilize clients 110, 112, and 114 to access the services provided by server 104 and/or server 106.

Clients 110, 112, and 114 may be, for example, mobile data processing systems, such as cellular telephones, smart phones, personal digital assistants, gaming devices, or handheld computers, with wireless communication links to network 102. In addition, clients 110, 112, and 114 may be personal computers, network computers, and/or portable computers, such as laptop computers, with wire and/or wireless communication links to network 102. It should be noted that clients 110, 112, and 114 may represent any combination of computers and mobile data processing systems connected to network 102.

Storage 108 is a network storage device capable of storing data in a structured or unstructured format. Storage 108 may provide, for example, storage of: a plurality of different topics and/or categories of interest to social media users; a database of keywords associated with each of the plurality of different topics and/or categories; a sentiment dictionary that defines sentiments for all or a portion of the keywords in the keyword database; a plurality of online messages posted on one or more social media websites that includes keywords contained within the keyword database; social media conflict visualization applications; communities of social media users based on similar sentiments regarding particular topics or categories of interest; names and identification numbers of a plurality of users; and account information associated with each of the plurality of users. Furthermore, storage unit 108 may store other data, such as authentication or credential data that may include user names, passwords, and/or biometric data associated with each of the plurality of users and system administrators.

Also, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 106 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of computer readable storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores social media conflict visualization application 218, topics/categories 220, sentiment dictionary 222, online messages 224, and communities of social media users 226. However, it should be noted that persistent storage 208 may store any type of application, module, and data utilized by the different illustrative embodiments. Social media conflict visualization application 218 is a software application that generates a visual display of public conflicts contained within a plurality of online messages posted by social media users on a set of one or more social media websites.

Topics/categories 220 list a plurality of different topics and/or categories of discussion by social media users on the set of social media websites. Topics/categories 220 include keywords 228. Keywords 228 are sets of keywords that are associated with each of the different topics and/or categories in topics/categories 220.

Sentiment dictionary 222 defines matching sentiments for keywords in keywords 228. A sentiment is a human emotion or feeling associated with a particular word. Sentiment dictionary 222 includes sentiment scores 230 and sentiment score ranges 232. Sentiment scores 230 provide a corresponding sentiment value or number for each keyword in keywords 228 that have a matching sentiment in sentiment dictionary 222. Sentiment score ranges 232 provide a full range of sentiment scores corresponding to all keywords in the set of keywords associated with a particular topic or category of discussion. Data processing system 200 may utilize sentiment score ranges 232 to generate a legend for the visual display of public conflict contained within online messages regarding the particular topic or category of discussion.

Online messages 224 represent a plurality of online messages that a plurality of different social media users posted on a set of one or more social media websites regarding different topics and/or categories in topics/categories 220. Online messages 224 may represent any type of message that may be sent electronically via a network. Online messages 224 include keywords 234. Keywords 234 match different keywords found in keywords 228 associated with topics/categories 220.

Communities of social media users 226 represent at least two different groups or sets of social media users. Data processing system 200 generates the different communities of social media users 226 based on data processing system 200 determining that certain groups of social media users have similar sentiments regarding a particular topic or category of discussion. Data processing system 200 determines the similar sentiment based on the corresponding sentiment scores of the keywords authored by a particular group of social media users regarding a particular topic or category.

Communications unit 210, in this example, provides for communication with other data processing systems and computing devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user, such as system administrator.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 236 is located in a functional form on computer readable media 238 that is selectively removable and may be loaded onto or transferred to data processing system 200 for running by processor unit 204. Program code 236 and computer readable media 238 form computer program product 240. In one example, computer readable media 238 may be computer readable storage media 242 or computer readable signal media 244. Computer readable storage media 242 may include, for example, an optical or magnetic disc that is inserted or placed into a drive or other device that is part of persistent storage 208 for transfer onto a storage device, such as a hard drive, that is part of persistent storage 208. Computer readable storage media 242 also may take the form of a persistent storage, such as a hard drive, a thumb drive, or a flash memory that is connected to data processing system 200. In some instances, computer readable storage media 242 may not be removable from data processing system 200.

Alternatively, program code 236 may be transferred to data processing system 200 using computer readable signal media 244. Computer readable signal media 244 may be, for example, a propagated data signal containing program code 236. For example, computer readable signal media 244 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 236 may be downloaded over a network to persistent storage 208 from another device or data processing system through computer readable signal media 244 for use within data processing system 200. For instance, program code stored in a computer readable storage media in a data processing system may be downloaded over a network from the data processing system to data processing system 200. The data processing system providing program code 236 may be a server computer, a client computer, or some other device capable of storing and transmitting program code 236.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 242 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that public conflict in social media is a complex phenomenon involving multiple communities of users, different topics, and various events. It is interesting to find out which topics divide communities of social media users, which events provoke public conflicts, and how the sentiments of the social media users regarding the topics and events evolve over time by analyzing the social media data. However, social media datasets are huge and unstructured. As a result, detecting public conflict between social media users and tracing the different conflict processes on social media websites is challenging.

Illustrative embodiments utilize a visual analysis system to help people gain insight into public conflicts on social media websites, better understand when and why the public conflicts occur, and how the public conflicts evolve over time. Illustrative embodiments highlight three major characteristics of a public conflict. First, illustrative embodiments determine the different groups of social media users that are involved in the public conflict. Second, illustrative embodiments determine when and how the sentiment trends of the different social media user groups evolve over time regarding the public conflict. Third, illustrative embodiments provide a summarization of the discussions or conversations corresponding to the evolution of the sentiment trends, which provides the context of the public conflict between the different groups of social media users.

Illustrative embodiments analyze and visualize such a social temporal process by determining sentiments of individual social media users at specified time intervals. Then, illustrative embodiments perform clustering of the social media users into groups based on their determined sentiments. Afterward, illustrative embodiments visually represent the results of the social temporal process as belts of sentiment streams that may be similar in appearance to double-stranded helices, such as, for example, DNA helices.

Illustrative embodiments compare sentiment evolution trends of the different communities of social media users as conflict and co-occurrence pairs. In addition, the visualization shows information details of related events as event boxes containing keywords, which connect the two sentiment stream belts of the different communities, indicating how the different communities response to these events over time and providing a summary of the context of the public conflict. The two communities are visualized as two curving sentiment stream belts polarized between positive and negative sentiment poles along a specified timeline. Further, illustrative embodiments go beyond mere positive and negative opinion of social media users regarding a particular topic of discussion by including more sentiment types, such as joy and mad, happy and sad, and the like. Thus, illustrative embodiments are capable of analyzing and visually unfolding the dynamics of public conflict in both the social media domain and temporal domain.

For example, consider the following scenario. Alice is a social scientist with a primary interest in tracing and analyzing public conflicts within social media websites. Alice utilizes an illustrative embodiment to help her with this task. Alice directs the illustrative embodiment to trace and analyze a public conflict on a set of one or more social media websites regarding a political debate. The illustrative embodiment then collects a set of online messages posted by users of the set of social media websites discussing the political debate. Afterward, the illustrative embodiment automatically analyze the online messages regarding the political debate and recommends two communities of social media users whose sentiments conflict the most with each other. Then, the illustrative embodiment generates a visualization of the conflict between the two communities.

Based on this generated visualization, Alice explores the conflict by zooming in and zooming out on different ranges of time, changing sentiment poles to identify the most conflicting sentiments, and changing a scale of the generated visualization to a power scale to enhance conflict patterns. After this exploration, Alice finds that a series of conflicts occurred over a particular period of time within two specified sentiment poles. In addition, Alice selects an event box between sentiment streams of the two communities of social media users where the most severe conflict occurred between the communities. As a result of Alice selecting the event box, the illustrative embodiment displays a tag cloud as a popup box or a tool tip, for example, to represent the keywords of the selected event. Further, the illustrative embodiment retrieves and lists the related online messages within a scrollable area of the visualization.

Some of the displayed keywords and online messages within the visualization attract Alice's attention. Consequently, Alice switches to an event view that detects changes in the displayed keywords over time. In the event view, Alice finds that one of the keywords suddenly changed from one community side to another and then changed back again after a short period of time. This sudden change implies an abnormal behavior known as a hijacking behavior. Alice focuses on that keyword at the changing points and highlights all of the users that mentioned that keyword at the changing points. Alice suspects that one of the highlighted users, which was most active during that time, could be a sentiment hijacker. A sentiment hijacker is a social media user that is trying to influence a community's sentiment by falsely posting words that represent a sentiment opposite of the user's true sentiment regarding the topic of discussion. Alice may then highlight and record the sentiment hijacker's profile for future analysis. Further, Alice may conduct similar analyses by filtering out other sentiment evolution patterns, such as co-occurrence.

With reference now to FIG. 3, a diagram of a conflict visualization process overview is depicted in accordance with an illustrative embodiment. Conflict visualization process overview 300 may be implemented in a computer, such as data processing system 200 in FIG. 2. Conflict visualization process overview 300 includes data preprocessing step 302, public conflict visualization step 304, and user interaction step 306. A social media conflict visualization application, such as social media conflict visualization application 218 in FIG. 2, may perform data preprocessing step 302, public conflict visualization step 304, and user interaction step 306. However, it should be noted that conflict visualization process overview 300 may include more or fewer steps than shown.

Generally, illustrative embodiments preprocess the online message data before generating a visualization of the data. Then, illustrative embodiments lay out the user groups of each community and connect the user groups through a smooth sentiment stream belt of each community. Finally, illustrative embodiments lay out the events between community pairs to provide additional context regarding the public conflict.

Data preprocessing step 302 processes a collection of online messages, such as online messages 308, which relate to a particular topic of interest to social media users on a set of social media sites. Online messages 308 may be, for example, online message data 224 in FIG. 2. Data preprocessing step 302 selects active social media users and keywords with a high level of occurrence (e.g., keywords that occur in online messages regarding a particular topic more than a threshold number). Based on online messages 308, which are posted by active users on the set of social media sites regarding the particular topic, data preprocessing step 302 analyzes and determines sentiments of the active users by using filtering, clustering, analyzing sentiment, and smoothing 310. Based on the determined sentiments, data preprocessing step 302 clusters the social media users into communities of social media users for further analysis. Data preprocessing step 302 builds indices 312 based on online messages 308 to support filtering and querying.

In addition, data preprocessing step 302 supports public conflict visualization step 304 in real time. Public conflict visualization step 304 transforms and renders the data provided by data preprocessing step 302. Public conflict visualization step 304 includes user group polarization 314, community belts layout 316, and events layout 318. User group polarization 314 polarizes groups of social media users between selected sentiment poles based on determined sentiments of the different groups of social media users. Community belts layout 316 renders the polarized groups of social media users as communities of social media users along different helical sentiment streams on a social media conflict visualization graph, such as social media conflict visualization graph 320. Community belts layout 316 renders the different helical sentiment streams of the two communities of social media users as user community helical sentiment stream 1 322 and user community helical sentiment stream 2 324, for example.

Events layout 318 renders event boxes containing keywords, such as keywords 330, between user community helical sentiment stream 1 322 and user community helical sentiment stream 2 324. Keywords, 330 are keywords that the active social media users included within online messages 308 regarding the particular topic of discussion that caused the public conflict. User interaction step 306 allows a user to interact with social media conflict visualization graph 320. User interactions may include, for example, querying, scaling, highlighting, and context switching. The user interactions feed back into data preprocessing step 302 and public conflict visualization step 304 to enable exploration of online messages 308.

Data preprocessing step 302 comprises four steps. First, data preprocessing step 302 samples online messages 308 by filtering out online messages and keywords authored by unimportant users to reduce the scope of the analysis. Then, data preprocessing step 302 conducts a dictionary-based sentiment analysis to analyze the sentiment of each of the remaining users based on the online messages posted, reposted, and replied to by each of the remaining users. Data preprocessing step 302 focuses on the sentiment pairs. Finally, data preprocessing step 302 clusters the remaining users based on similar sentiments regarding the particular topic of discussion into communities and smoothes the sentiments of these communities.

With regard to online message data sampling, illustrative embodiments filer the large dataset to reduce the analysis scope. Illustrative embodiments filter social media users and keywords based on the number of their occurrences within a specified period of time. A user occurs when the user posts an online message, reposts an online message, or replies to an online message. A keyword occurs when the keyword is contained within a post, repost, or reply. Illustrative embodiments only select those users and keywords with a high level of occurrence (e.g., above a threshold number). Illustrative embodiments also compute statistical information, such as the activeness of users and frequency of keywords within specified ranges of time, while performing the filtering.

With regard to determining sentiments of social media users, assume that there are n users and T timestamps. At each timestamp t=1, 2, . . . , T, illustrative embodiments associate each user $u_i$, i=1, 2, . . . , n with a sentiment, which illustrative embodiments determine from the online messages posted by each user during t−1 to t. Let W be the keyword set of size m, which includes the keywords contained in all the online messages. Illustrative embodiments then form a user/online message matrix $X^{(t)} \in \mathbb{R}^{n \times m}$ with its (i, j)-th entry equal to the frequency of the j-th keyword appearing in the online messages the i-th user posted during time t−1 to t. If illustrative embodiments have a sentiment score $\Phi_j$ associated with each keyword $w_j \in \mathcal{W}$, then illustrative embodiments can determine the sentiment score of the i-th user at time t as $$\psi_i^{(t)} = \sum_{j=1}^{m} X_{ij}^{(t)} \phi_{ij}$$ equation (1)

which is the linear superposition of the sentiments of the keywords appearing in the online messages posted by user i between t−1 and t.

Regarding sparsity of keyword labeling, one possible problem with applying the equation above is that illustrative embodiments need to have a sentiment score corresponding to each of the keywords in W. Consequently, illustrative embodiments use publicly available labeled keyword sentiment datasets. Illustrative embodiments utilize a diffusion-based, sentiment propagation approach to propagate the sentiment scores from labeled keywords to unlabeled keywords using a keyword co-occurrence graph structure. As a result, illustrative embodiments are able to obtain the sentiment scores for most of the keywords in the graph. Specifically, illustrative embodiments generate a complete keyword adjacency matrix $$A = \Delta \left[ \sum_{t=1}^{T} (X^{(t)})^T X^{(t)} \right] \in \mathbb{R}^{m \times m}$$

where $$(\Delta[G])_{ij} = \begin{cases} 1, & \text{if } G_{ij} > 0 \\ 0, & \text{otherwise} \end{cases}.$$

Therefore, $A_{ij}=1$ if and only if both keywords i and j at least appear within online messages that one social media user posted within a specified time frame and $A_{ij}=0$ if keywords i and j never appear together in any social media user's online messages within any specified time frame. Then, illustrative embodiments can generate a keyword co-occurrence graph A, in which each node in A corresponds to a specific keyword and an edge linking node i and j if $A_{ij}=1$.

After illustrative embodiments generate the keyword co-occurrence graph A, illustrative embodiments normalize the rows of A so that each row sums up to one. Then, illustrative embodiments propagate the sentiment scores of labeled keywords to unlabeled keywords using the following equation:

$$f^{(t+1)} + \alpha A f^{(t)} + (1-\alpha) f^{(0)}$$

where $f^{(t)} \in \mathbb{R}^m$ is the estimated keyword sentiment score vector and $f_j^{(0)} = \phi_j$ if $w_j$ is labeled, $f_j^{(0)} = 0$ otherwise. $0 < \alpha < 1$ is the propagation rate. The immediately preceding equation above shows that at each step, every keyword "forgets" a certain portion of its initial sentiment score and "absorbs" the sentiment scores of its adjacent neighborhood keywords. Illustrative embodiments can prove this premise using the Perron-Frobenius theorem that with t→∞, this propagation procedure will converge to the following solution:

$$f^{(\infty)} = (1-\alpha)(I - \alpha A)^{-1} f^{(0)}$$

where I is an identity matrix of order m.

In real world applications, illustrative embodiments can directly use the immediately preceding equation above to estimate the keyword sentiment scores without iterating step by step. In the case when m is too large, illustrative embodiments can use random sampling strategies.

Another possible problem of temporal sentiment analysis on real-world applications is sparsity of online message data. For example, a social media user may not post any online messages regarding a particular topic of interest within one or more specified time intervals. To address this problem, illustrative embodiments use equation (1) above to determine the user's sentiment scores in the time intervals within which the user did post online messages regarding the particular topic of interest. For time intervals when the user did not post any online messages, illustrative embodiments use one-dimensional spline interpolation to estimate the user's corresponding sentiment score from scores within other time intervals. In addition, illustrative embodiments can adjust the order of the fitted spline function to obtain a better smoothness or accuracy tradeoff of the interpolation. Another possible issue is that it does not make sense to do the interpolation if the user's online message postings are too sparse to consider. Therefore, illustrative embodiments filter out those social media users that did not post online messages regarding the particular topic of interest within more than 50 percent of the specified time interval segments.

After illustrative embodiments have determined the sentiments of each of the social media users posting online messages regarding the particular topic of interest, illustrative embodiments cluster the social media users according to their determined sentiments over time. Specifically, let $\psi_i = [\psi_i^{(1)}, \psi_i^{(2)}, \ldots, \psi_i^{(T)}]^T$ be the sentiment vector for user i, then illustrative embodiments measure a sentiment gap between user i and user j by $$G(i, j) = \|\psi_i - \psi_j\|_2^2 = \sum_{t=1}^{T} (\psi_i^{(t)} - \psi_j^{(t)})^2.$$

As shown by the immediately preceding equation above, the more similar the sentiment trends of users i and j, the smaller the gap $G(i, j)$ will be, and vice versa. After illustrative embodiments compute all pair-wise user sentiment gaps, illustrative embodiments can apply a distance based clustering algorithm, such as, for example, Hierarchical Agglomerative Clustering (HAC), to cluster the social media users so that social media users within the same cluster will have similar sentiment trends.

Based on the sentiment analysis above, illustrative embodiments are capable of illustrating a layout of these groups of social media users. Illustrative embodiments polarize user groups between two sentiment poles over a selected time interval based on their respective sentiments. Illustrative embodiments horizontally determine an x coordinate of a particular user group on a timeline (i.e., the x-axis) based on a timestamp of the particular user group at a particular point in time within the selected time interval. Further, illustrative embodiments vertically determine a y coordinate of a particular user group on a sentiment legend line (i.e., the y-axis) by using the particular user group's determined sentiment score between the two sentiment poles (e.g., positive and negative) at opposite ends of the sentiment legend line. Formally, with a user group g at time t having sentiment s, illustrative embodiments define position p of group g as p=(x(t), y(s)) where function x(t) computes the x coordinates of time t along the x-axis within a graph visualization of a public conflict on a display screen. Similarly, function y(s) computes the y coordinates of a sentiment value s along the y-axis within the graph. By default, both x(t) and y(s) are linear mapping functions without any data distortion. In some instances, illustrative embodiments may use a power function $y'(s)=y(s^{0.4})$ to map sentiment along the y-axis on the graph. The power function enlarges small differences between mapped sentiments on the graph and provides more space between the different community sentiment stream belts to show keyword information details within event boxes.

The space of a particular user group may be dense depending on the number of users included in the particular user group. Illustrative embodiments pack as many users into a user group as possible. A sentiment stream belt of a particular community includes a series of user groups with similar sentiments and shows over a selected time interval the sentiment evolution of the particular community. Illustrative embodiments generate a sentiment stream belt of a particular community by interpolating the sentiments and sizes between any two consecutive user groups that belong to the same community within a selected time interval. The process requires a smooth interpolation for visual aesthetic purposes. At the same time, a smooth interpolation is necessary because in most cases, users change their sentiments smoothly and continuously. Illustrative embodiments may achieve this smooth interpolation requirement using a spline with $C^1$ or $C^2$ continuity. However, in the case of generating upper and lower boundaries of a community's sentiment stream belt based on parallel splines, illustrative embodiments should carefully select the control points of these splines. Improper selection of the control points for the splines, may generate community sentiment stream belts with inconsistent thicknesses that indicate incorrect information about the community size.

Illustrative embodiments first connect the center of each user group within a community by a polyline. Then, illustrative embodiments use a sweep line to scan from the left to the right along the polyline. While sweeping, illustrative embodiments continuously adjust the orientation of the sweep line to keep the sweep line perpendicular to the polyline segment. Illustrative embodiments mark two intersections ($C_t$, $C'_t$) between the sweep line as a pair of control points. For the t-th circular user group, illustrative embodiments chose several control point pairs as the sweep line is walking along the circular user group, such that illustrative embodiments embed the user group within the community's sentiment stream belt. Illustrative embodiments use the chosen pairs of control points as the upper and lower boundaries of the community's sentiment stream belt at time t, respectively. Thus, these pairs of intersections generate two sets of control points, $C=\{c_1, \ldots, c_n\}$ and $C'=\{c_1, \ldots, c_n\}$, for the upper and lower boundaries of the community's sentiment stream belt, respectively. To smoothly connect these control points while maintaining the smoothness of the boundaries, illustrative embodiments construct an interpolating spline with the $C^2$ continuity by smoothly connecting a series of Bezier splines together.

Illustrative embodiments lay out events in the middle of the two sentiment stream belts of the different communities at the particular time within the selected time interval when the events occur. Each event box connects two different user groups within the different communities in which the users are actively involved in the event. A user is involved in an event by mentioning (e.g., posting, reposting, or replying) keywords associated with the event. Thus, illustrative embodiments layout event keywords within the event box such that their distances to each community sentiment stream belt are directly proportional to the amount of user mentions from that community. Illustrative embodiments slightly adjust the final positions of the keywords vertically within the event box to avoid overlapping.

Illustrative embodiments trace position changes of a keyword through a polyline in an event view. When the number of keywords is large, the crossing of polylines within the event view may result in visual clutter, thus making the keyword position changes difficult to follow. Illustrative embodiments may use color opacity enhancement to highlight polylines with interesting patterns by adjusting the opacity of each polyline. Particularly, illustrative embodiments may define the amount of "interestingness" of a polyline based on the smoothness of the polyline, thus resulting in two different polyline patterns. For example, a polyline with large smoothness may indicate a keyword that either leans toward a particular community or is in the middle of the two communities. As another example, a zigzag polyline with small smoothness may indicate the changes of the keyword. Illustrative embodiments compute a normalized 12-norm smoothness $\kappa_i$ for the i-th polyline. Illustrative embodiments use either $\kappa_i$ or $1-\kappa_i$ as the color opacity of the polyline to show these two types of patterns, respectively. Illustrative embodiments allow users to switch between these two modes for seeking their own interests.

Figure 4:
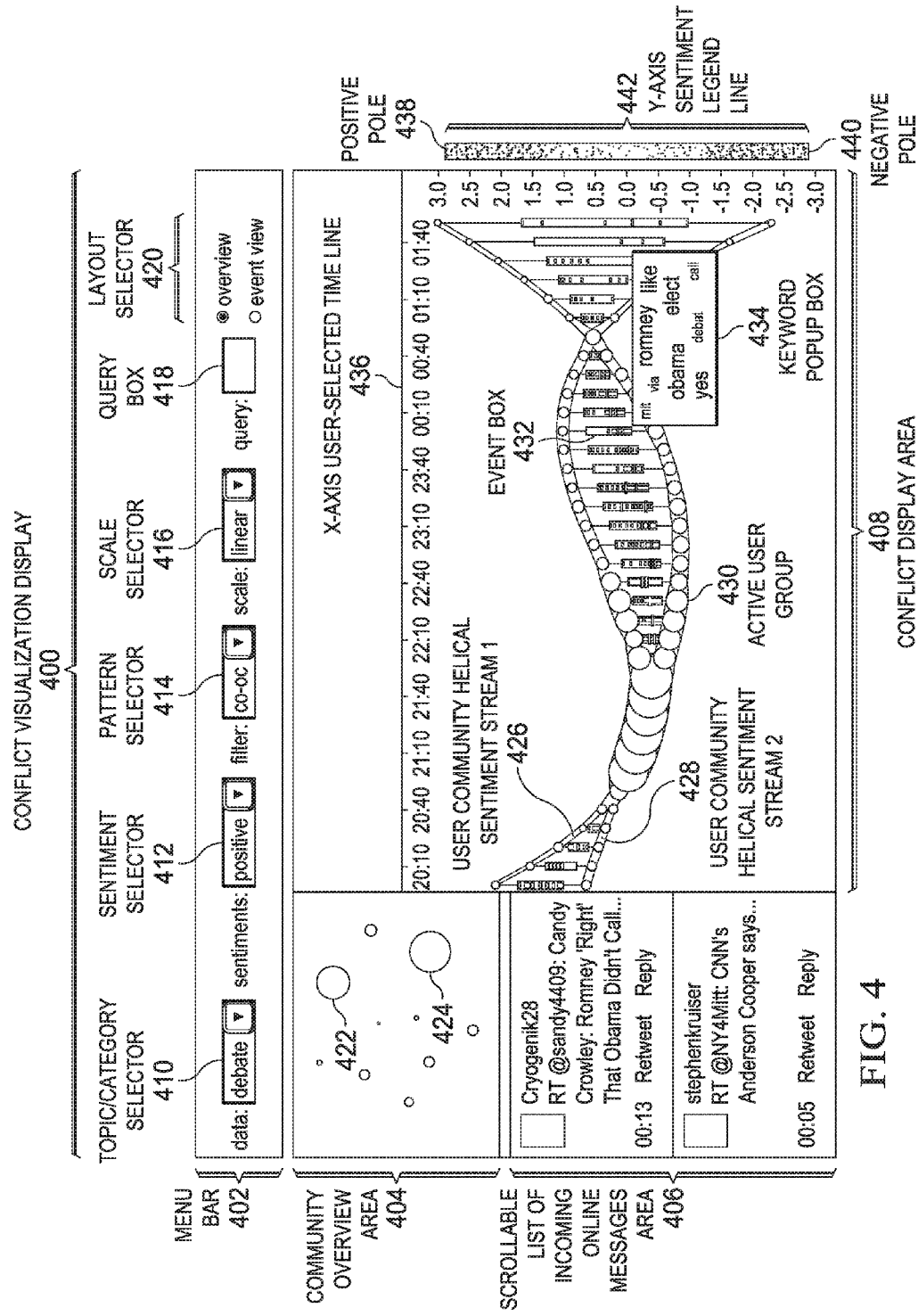
FIG. 4 is a diagram illustrating an example of a conflict visualization display in accordance with an illustrative embodiment.

With reference now to FIG. 4, a diagram illustrating an example of a conflict visualization display is depicted in accordance with an illustrative embodiment. Conflict visualization display 400 is generated by a computer, such as data processing system 200 in FIG. 2. The computer uses conflict visualization display 400 to illustrate a public conflict between different communities of social media users having different sentiments regarding a particular topic of conversation contained within online messages posted by the social media users on a set of one or more social media websites.

In this example, conflict visualization display 400 includes menu bar 402, community overview area 404, scrollable list of incoming online messages area 406, and conflict display area 408. Menu bar 402 provides a user with the ability to select different options and functions within conflict visualization display 400. Specifically, menu bar 402 includes topic/category selector 410, sentiment selector 412, pattern selector 414, scale selector 416, query box 418, and layout selector 420.

Topic/category selector 410 allows a user to select a particular topic or category of interest to determine how much of a public conflict exists regarding the selected topic or category. Sentiment selector 412 allows the user to select the sentiment poles, such as positive and negative, happy and sad, and the like. Pattern selector 414 allows the user to select a particular pattern, such as waving, conflict, and co-occurrence. Scale selector 416 allows the user to select between a linear scale and a power scale. Query box 418 allows the user to track particular keywords of interest. Layout selector 420 allows the user to select between a conflict overview and an event view.

Community overview area 404 display all the different communities associated with the select topic or category of interest. The size of each community within community overview area 404 indicates a relative number of social media users included in that particular community. In this example, the user selects user-selected community 1 422 and user-selected community 2 424 for comparison of sentiments regarding the selected topic or category of interest.

Scrollable list of incoming online messages area 406 displays incoming online messages posted by the social media users based on a selected event box in focus, such as event box 432. In this example, conflict display area 408 shows user community helical sentiment stream 1 426, user community helical sentiment stream 2 428, active user group 430, event box 432, keyword popup box 434, x-axis user-selected time line 436, positive pole 438, negative pole 440, and y-axis sentiment legend line 442. User community helical sentiment stream 1 426 and user community helical sentiment stream 2 428 represent the sentiments of user-selected community 1 422 and user-selected community 2 424, respectively, regarding the selected topic or category of interest during a specified interval of time. User community helical sentiment stream 1 426 and user community helical sentiment stream 2 428 are the sentiment stream belts of the different communities of social media users.

Active user group 430 represents only one user group of active social media users posting online messages regarding the selected topic or category of interest at a particular point in time within user community helical sentiment stream 1 426. However, it should be noted that each circular area within user community helical sentiment stream 1 426 and user community helical sentiment stream 2 428 represents an active group of social media users at a particular point in time within x-axis user-selected time line 436. Also, it should be noted that the size of each circular area indicates the number of active users within that particular active user group at that particular point in time.

Event box 432 links two different active user groups within the two different user community helical sentiment streams. Event box 432 represents a plurality of event boxes located between the two different user community helical sentiment streams. Each event box contains keywords used by the active user groups linked by a particular event box. Keyword popup box 434 is a tag cloud showing the keywords within event box 432, which is currently in focus by a user in this example.

X-axis user-selected time line 436 is a time interval segment specified by a user to view a public conflict contained within online messages posted by social media users on a set of social media websites during that specified interval of time. Positive pole 438 and negative pole 440 are polar opposite sentiment poles located at the top and bottom of y-axis sentiment legend line 442. Y-axis sentiment legend line 442 provides numerical values for a range of sentiment scores corresponding to keywords used by the social media users regarding the selected topic or category of interest during the specified interval of time.

In this example, the computer generates conflict visualization display 400 to illustrate moments of heated discussions between social media users during a political debate. Conflict visualization display 400 shows the dynamics and divergence of social media users' sentiments during the political debate. The computer depicts the sentiments of the different communities of social media users as curving belts that fluctuate between positive pole 438 and negative pole 440 over a user-specified period to time.

In this example, sentiments of the different communities of social media users diverge at time 22:10, when the two political candidates begin debating the handling of an embassy attack. After the political debates ends, at approximately time 00:40, the two sentiment streams crisscross. A series of discussions or conversation corresponding to the polarization of the two different communities of social media users are shown as event boxes, such as event box 432, connecting the two sentiment stream belts. Within each event box, representative keywords are shown as small horizontal bars that are colored based on their corresponding sentiments and sized based on their frequency of occurrence. Representative social media users that were actively involved in these event discussions are found in the circles carried along by the sentiment stream belts of the different communities of social media users.

Typically, public conflict between social media users consists of three factors, namely, the conflicting communities of social media users regarding a particular topic of discussion, the sentiment response of the conflicting communities to events of interest, and the changing of event details over time. Social media websites usually generate heterogeneous, multidimensional data that contain both structured information, such as the underlying social network, and unstructured information, such as the online messages posted by the social media users. Visually summarizing and representing these data are required to decompose and encode key information into a set of structurally organized visual components that can be easily identified across different patterns. To facilitate an intuitive understanding of the evolution of emotions on a social media website, illustrative embodiments show how two different sentiment streams associated with different communities of social media users are connected and related. The metaphorical pattern of DNA helices allows users to grasp a visual narrative of the sentiment co-evolution of the different communities of social media users and enables an immediate interpretation of the conflicting sentiments without spending much effort on learning the meaning of each visual component.

When detecting public conflicts in social media, identifying the sentiments of social media users over time is crucial. Conflicting behavior regarding a particular topic may be viewed as two different groups of people having opposing sentiments with regard to the topic. Supporting behavior regarding a particular topic may be viewed as people sharing similar sentiments with regard to the topic. Traditional group detection methods divide users into different groups based on their connections to one another, such as family members, co-workers, friends, et cetera. Unfortunately, users in these different groups do not necessarily share similar attitudes toward a particular topic. As a result, clustering users based on their sentiments regarding a particular topic of interest is crucial for detecting patterns of public conflict among social media users. Illustrative embodiments assume that the sentiment trends of competing communities of social media users will not always change in the same way. Thus, illustrative embodiments use a sentiment clustering algorithm that does not cluster the competing communities together.

Understanding the reasons for conflicts and the evolution of sentiment trends of these conflicts requires a drilling down into the context details of the conflicts and tracing the specific topics and the corresponding events that caused the conflicts. Therefore, illustrative embodiments define a social event as a group of important online messages posted by social media users regarding a given topic at a specified time. Illustrative embodiments represent these social events as the context of the conflict that connects two conflicting communities of social media users involved in the events.

However, reducing visual clutter when generating a visual display of the public conflict is challenging when using large volumes of social media data. Illustrative embodiments utilize visual clutter reduction techniques to provide a clear view of the sentiment trends during public conflicts in social media. Illustrative embodiments reduce visual clutter through data filtering. Illustrative embodiments filter out and present the community pairs involved in a public conflict, while keeping other communities of social media users hidden to highlight the most interesting patterns. In addition, illustrative embodiments enhance the polar changes of keywords used by the different communities of social media users based on color opacity while rendering conflict visualization display 400.

The anti-parallel form of the helices represents a public conflict regarding a particular topic of discussion in which two different community sentiment stream belts run in opposite sentiment directions. A sentiment stream belt represents a community comprising a group of social media users who are involved in a focused discussion on a particular topic and share similar sentiments over time. At each timestamp within a user-specified period of time, illustrative embodiments summarize a community's sentiment by averaging the sentiments of all the active social media users within that community. By default, illustrative embodiments polarize each community's sentiment stream belt between two opposite sentiment poles, such as positive pole 438 and negative pole 440, along a vertical sentiment line and interpolate data samples at different timestamps along a horizontal timeline, such as timeline 436. Thus, illustrative embodiments generate a smooth curving belt whose shape indicates the sentiment transition trends of its respective community.

Further, illustrative embodiments double encode sentiment information on each community's sentiment stream belt to enhance visual patterns driven by sentiments of social media users included in a particular community. First, illustrative embodiments quantitatively represent sentiment information as a vertical distance on the display between a position of a community's sentiment stream belt and a position of either sentiment pole. Leaning toward one particular sentiment pole indicates more social media users within that community share that sentiment. Second, illustrative embodiments sentiment also represent sentiment information by utilizing a color gradient from green to red, which corresponds to the two opposing sentiment poles. In addition, illustrative embodiments encode a community's size by the thickness of the corresponding sentiment stream belt. The thickness of a sentiment stream belt implies a level of influence of the community in the conflict. For example, if a community includes thousands of social media users, then the community's sentiment change results in greater influence as compared to a sentiment change of a ten person community.

A user may select, using sentiment selector 412, joy and sadness as the opposing sentiment poles within conflict visualization display 400. Joy may, for example, be placed at the top of the display in green and sadness may be placed at the bottom of the display in red. Illustrative embodiments polarize the two different communities of social media users between the sentiment poles of joy and sadness as curving belts whose colors are smoothly transitioned from green to red or red to green depending on the corresponding sentiments of the social media users within each community. Most of the time these sentiment stream belts of the different communities of social media users run in opposite directions showing strong emotional conflicts between the different communities, thus implying that a public conflict exists.

When multiple communities share similar sentiments, their sentiment stream belts may overlap resulting in visual clutter. Illustrative embodiments avoid this visual clutter by: (1) using a hierarchical clustering algorithm to group similar communities together and separate the communities by their sentiments regarding a particular topic as much as possible; and (2) providing a power sentiment scale that visually enlarges the gaps between communities.

Visual clutter also may occur when sentiment stream belts of two different communities of social media users show a mutual-conflict pattern. In this case, crossing of the different sentiment stream belts is unavoidable. When a crossing occurs at a particular timestamp where data are available, illustrative embodiments merge the two communities into one to avoid the crossing as the two communities are sharing the same sentiment at that particular point in time. In another case, when a crossing occurs at a point in time when data are generated by interpolation, illustrative embodiments overlay and render the sentiment stream belts with an alpha blending of colors to reduce the visual clutter.

Event box 432, which connects the two different sentiment stream belts, illustrates an event that involves social media users from both communities. Regarding a topic of focus, an event is a group of keywords that are frequently mentioned by social media users at a specific point in time within a specified time interval. Inside each event box, keywords are visualized as small horizontal bars with the size of each bar encoding the normalized frequencies of keywords and the color of each bar representing corresponding sentiments. At different points in time, social media users may discuss the topic using different keywords, which results in different events under the same topic. By default, the size of an event box varies based on the distance between the two sentiment stream belts. As a result, this design spontaneously assigns more room for showing event details when conflict occurs.

Illustrative embodiments superimpose a user group on top of a community's sentiment stream belt at each time point to show which social media users within a community are actively involved in the corresponding event. Illustrative embodiments consider these active social media users as key persons that directly contribute to the overall sentiment trend of the community to which they belong. At each time point, illustrative embodiments compute the activeness of each social media user with regard to the topic of interest by counting the number of times a particular social media user mentions the keywords associated with the event. A keyword mention may take the form of an online message post, a repost of an online message, or a reply to an online message that contains the keyword. Illustrative embodiments represent each active user group within a community, such as active user group 430, as a circular area embedded within the community's sentiment stream belt. Further, illustrative embodiments represent each user within an active user group as a dot within the circular area. The size of a dot and the color of a dot within the circular area represent a user's normalized activeness and corresponding sentiment, respectively, at a particular time point.

Furthermore, illustrative embodiments incorporate a set of interactive functionalities that further drill down into the details of online message data along topic, sentiment, and temporal dimensions. Illustrative embodiments allow users to rank and filter out three types of sentiment evolution patterns, namely, waving, conflict, and co-occurrence, based on several predefined measurements using pattern selector 414. Illustrative embodiments determine a waving pattern by calculating the standard derivation of a community's sentiments over time. The larger the standard deviation of the community's sentiments over time, the larger the waving pattern of the community's sentiment stream belt becomes. In addition, illustrative embodiments measure the similarity of sentiments between two different communities of social media users over time to determine conflict patterns and co-occurrence patterns. Formally, illustrative embodiments define sentiment similarity based on square error, while considering the size of a community:

$$sim_{ij} = \sum_t \omega_t \|s_t^{(i)} - s_t^{(j)}\|^2,$$

where $s_t^{(i)}$ is the sentiment value of the i-th community at time t, and where $\omega_t$ is the mean of the sizes of the two different communities at time t.

Illustrative embodiments normalize all measurements. Thus, illustrative embodiments define a conflict pattern as two helical curves with large standard deviations and a small sentiment similarity value, formally $\min(\Sigma_{k \in \{i,j\}}(sd_k) - sim_{ij})$. Illustrative embodiments define a co-occurrence pattern as two different communities of social media users with a maximum sentiment similarity value, formally $\max(sim_{ij})$.

Illustrative embodiments allow a user to change sentiment poles using sentiment selector 412, which is a dropdown menu in this example, to switch the sentiment context of conflict visualization display 400. Once the user changes the sentiment poles, illustrative embodiments compute new coordinates along y-axis sentiment legend line 442 and adjust visualizations to a reveal a different sentiment pattern within conflict display area 408.

Illustrative embodiments also allow a user to switch between two visualization views using layout selector 420, which is a radio button selector in this example. In the conflict overview view, illustrative embodiments double encode the sentiments of the different communities of social media users by color and position of the different sentiment stream belts of the two communities. A user can easily detect the overall sentiment evolution patterns in this conflict overview view. In the event view, illustrative embodiments illustrate event details and their keywords, which illustrative embodiments polarize between poles of the two different communities. Illustrative embodiments trace keyword changes in the event view. Illustrative embodiments switch between these two different views through animated transitions to help a user maintain mental maps.

Further, illustrative embodiments allow a user to visually enhance a conflict patterns by using scale selector 416, which is a drop-down menu in this example. A user may select between a linear scale and a power scale to adjust the positions of sentiment stream belts of the different communities. A linear scale represents a visual conflict pattern without any distortion. In contrast, a power scale enlarges small differences between the two different sentiment stream belts and allows for a detailed representation of events and keywords between the sentiment stream belts.

Illustrative embodiments also support semantic zoom in time. Illustrative embodiments hierarchically perform data aggregations from bottom-to-top based on time segments at different levels of granularity. As a result, a user is able to drill down into different levels of detail to explore both global and local patterns inside the online message data.

Illustrative embodiments further enable a user to highlight visual components within conflict display area 408 using various approaches. For example, when a user uses a mouse to hover a cursor over a particular keyword in an event box or over a particular social media user in a user group, illustrative embodiments may show a popup box or a tooltip to depict the label of the particular keyword and the name of the particular social media user. At the same time, illustrative embodiments also may highlight the same keyword across all the other event boxes or highlight the same social media user across all the other user groups to facilitate item tracing. When a user hovers a cursor over an event box, illustrative embodiments extract all keywords contained within the event box and represent the keywords as a tag cloud in a popup box, such as keyword popup box 434, or in a tooltip. Furthermore, illustrative embodiments automatically conduct a full text query based on these keywords to retrieve the top 50 most relevant online messages posted by social media users and place them in scrollable list of incoming online messages area 406.

Figure 5:
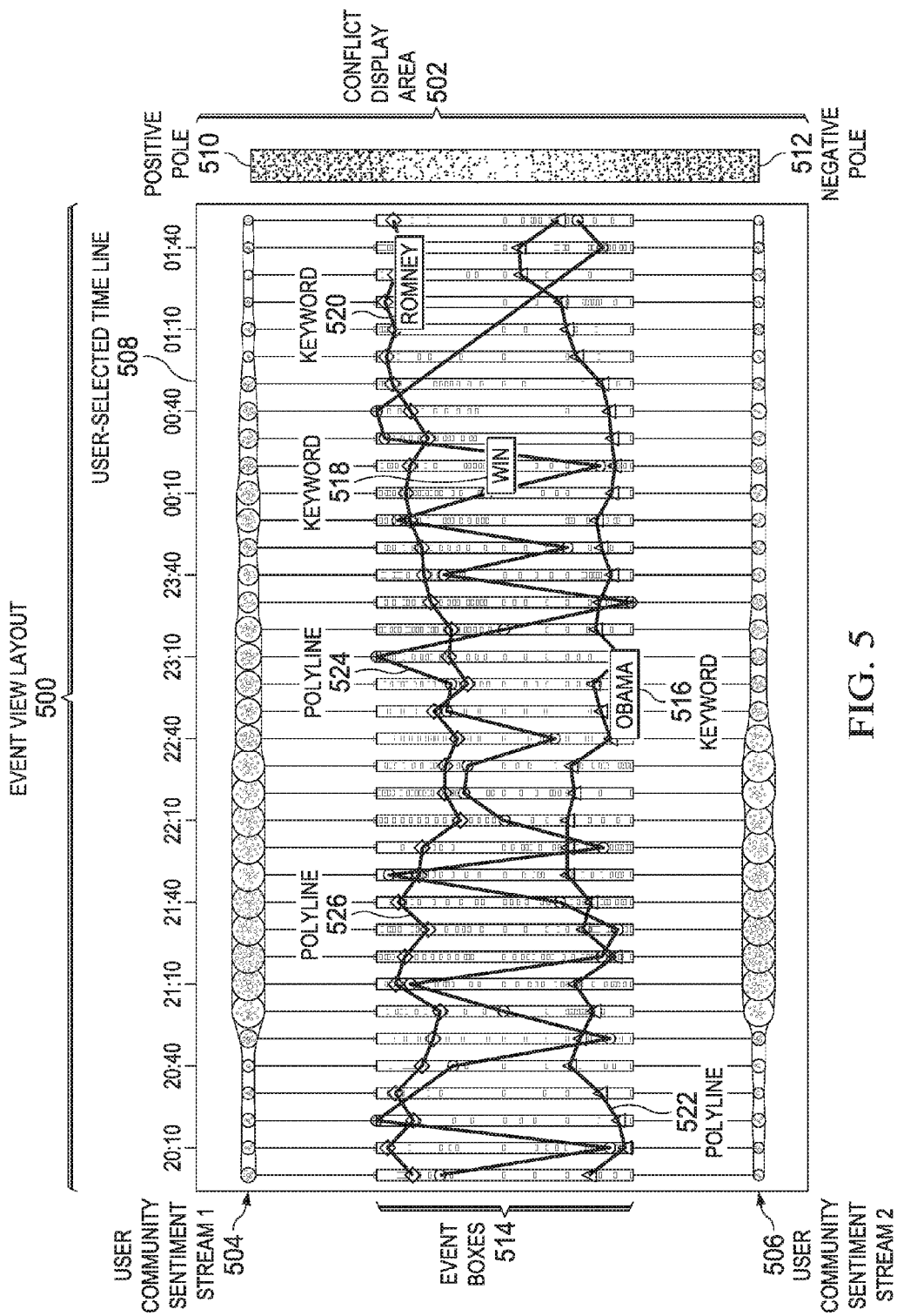
FIG. 5 is a diagram illustrating an example of an event view layout in accordance with an illustrative embodiment.

With reference now to FIG. 5, a diagram illustrating an example of an event view layout is depicted in accordance with an illustrative embodiment. Event view layout 500 is generated by a computer, such as data processing system 200 in FIG. 2. The computer uses event view layout 500 to illustrate the tracing and interpreting of transition trends of keywords over events.

Event view layout 500 includes conflict display area 502. Conflict display area 502 may be, for example, conflict display area 408 in FIG. 4. In this example, conflict display area 502 includes user community sentiment stream 1 504, user community sentiment stream 2 506, user-selected time line 508, positive pole 510, negative pole 512, and event boxes 514. User community sentiment stream 1 504 and user community sentiment stream 2 506 represent the sentiment streams of two different communities of social media users regarding a particular topic of discussion over a specified period of time. User-selected time line 508, positive pole 510, and negative pole 512 may be, for example, x-axis user-selected time line 436, positive pole 438, and negative pole 440 in FIG. 4.

Event boxes 514 contain keywords 516, 518, and 520. In this example, keyword 516 is the word "obama," keyword 518 is the word "win," and keyword 520 is the word "romney." Keyword 516 is connected by polyline 522 through event boxes 514. Similarly, keyword 518 is connected by polyline 524 and keyword 520 is connected by polyline 526 through event boxes 514.

Understanding a public conflict contained within online messages posted by social media users regarding a particular topic requires focusing on detailed events and keywords. In event view layout 500, the computer straightens out the sentiment stream belts of the two different communities and places one community on the top and one community on the bottom of conflict display area 502 as two community poles. Consequently, an empty space is left in the middle of conflict display area 502 for rendering the details of corresponding events and their keywords. The computer connects the same keywords within different event boxes by a polyline and polarizes the same keywords based on their relationship to each community.

When tracing a specific keyword in the event view, two types of transition trends are commonly found: 1) the keyword either leans toward the top community of social media users or leans toward the bottom community of social media users; or 2) the keyword wavers between the two different communities of social media users in the middle.

Using the transition trends of keywords together with a community's sentiments, the computer is able to identify a community's leaning during a political debate. For example, keyword 516, obama, leans toward the bottom community at time points when the bottom community shows a positive sentiment toward obama. This implies that the bottom community supports obama. The computer detects a similar trend when tracing keyword 520, romney, which leans toward the top community. Keyword 518, win, alternately leans toward each of the two communities depending on which community posts a win at a particular time point for their respective candidate during the political debate.

Figure 6:
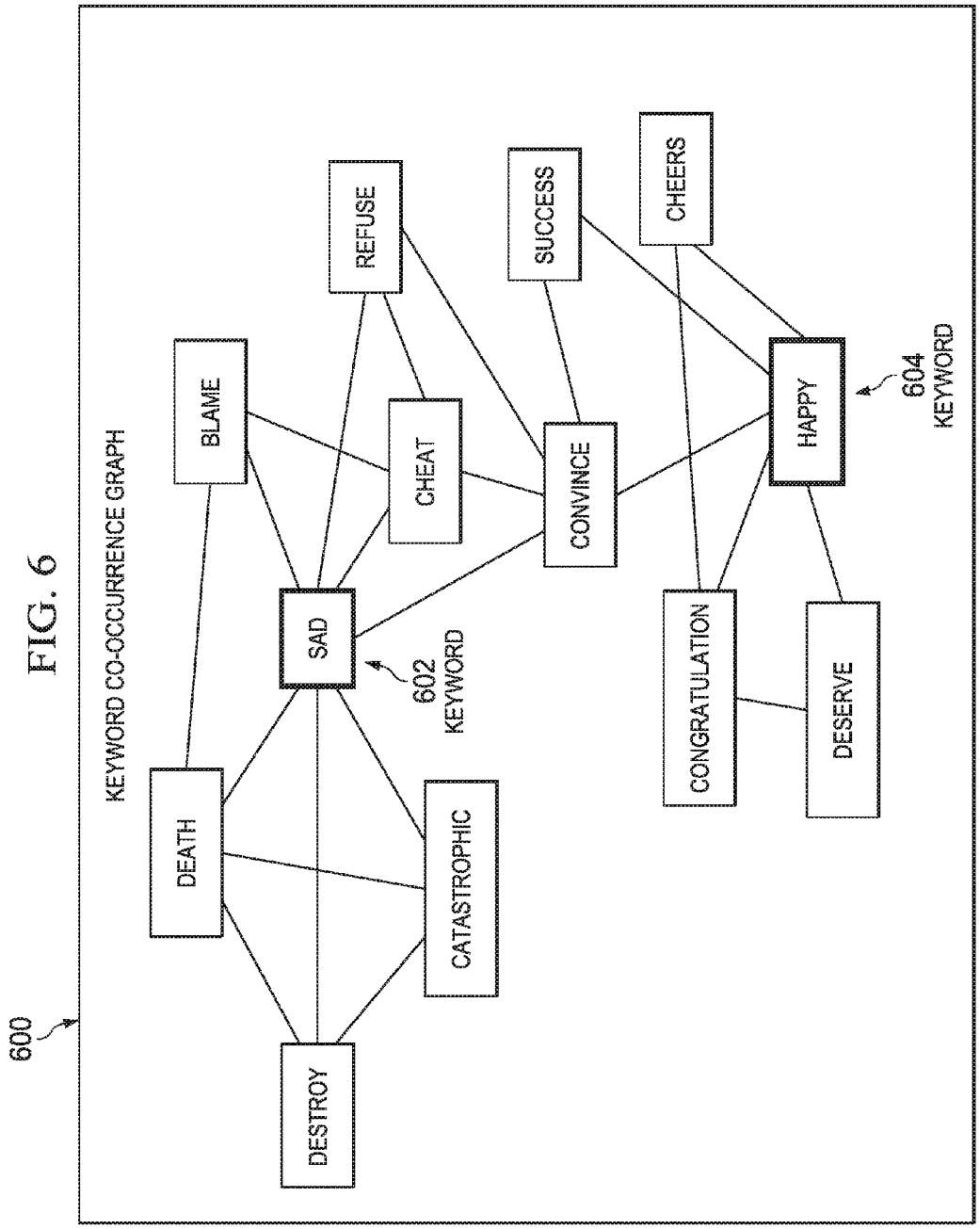
FIG. 6 is an illustration of an example of a keyword co-occurrence graph in accordance with an illustrative embodiment.

With reference now to FIG. 6, an illustration of an example of a keyword co-occurrence graph is depicted in accordance with an illustrative embodiment. Keyword co-occurrence graph 600 is generated by a computer, such as data processing system 200 in FIG. 2. The computer uses keyword co-occurrence graph 600 to propagate keyword sentiment scores to keywords that do not have a corresponding sentiment score.

Keywords co-occur when the keywords frequently appear together within online messages posted by social media users regarding a particular topic or category of discussion. The co-occurring keywords are shown as nodes and relationships between the keywords are shown as branches or vectors between the keyword nodes. The computer constructs keyword co-occurrence graph 600 using the keyword nodes and relationship vectors between the keyword nodes. Keyword 602 is the word "sad," which a set of social media users used within online messages. Keyword 604 is the word "happy," which another set of social media users used within online messages. Keyword 602 and keyword 604 are polar opposite words with regard to sentiment. Consequently, keywords 602 and 604 are not adjacent to one another within keyword co-occurrence graph 600.

The computer determines a corresponding sentiment score for the keyword sad and a corresponding sentiment score for the keyword happy using, for example, a sentiment dictionary, such as sentiment dictionary 222 in FIG. 2. Afterward, the computer labels the keyword sad with a negative sentiment score and labels the keyword happy with a positive sentiment score. However, the computer does not label any of the other keywords within keyword co-occurrence graph 600 because a corresponding sentiment score was not found for these keywords within the sentiment dictionary. As a result, the computer utilizes keyword co-occurrence graph 600 to propagate the sentiment scores of keywords sad and happy to adjacent keywords.

Figure 7:
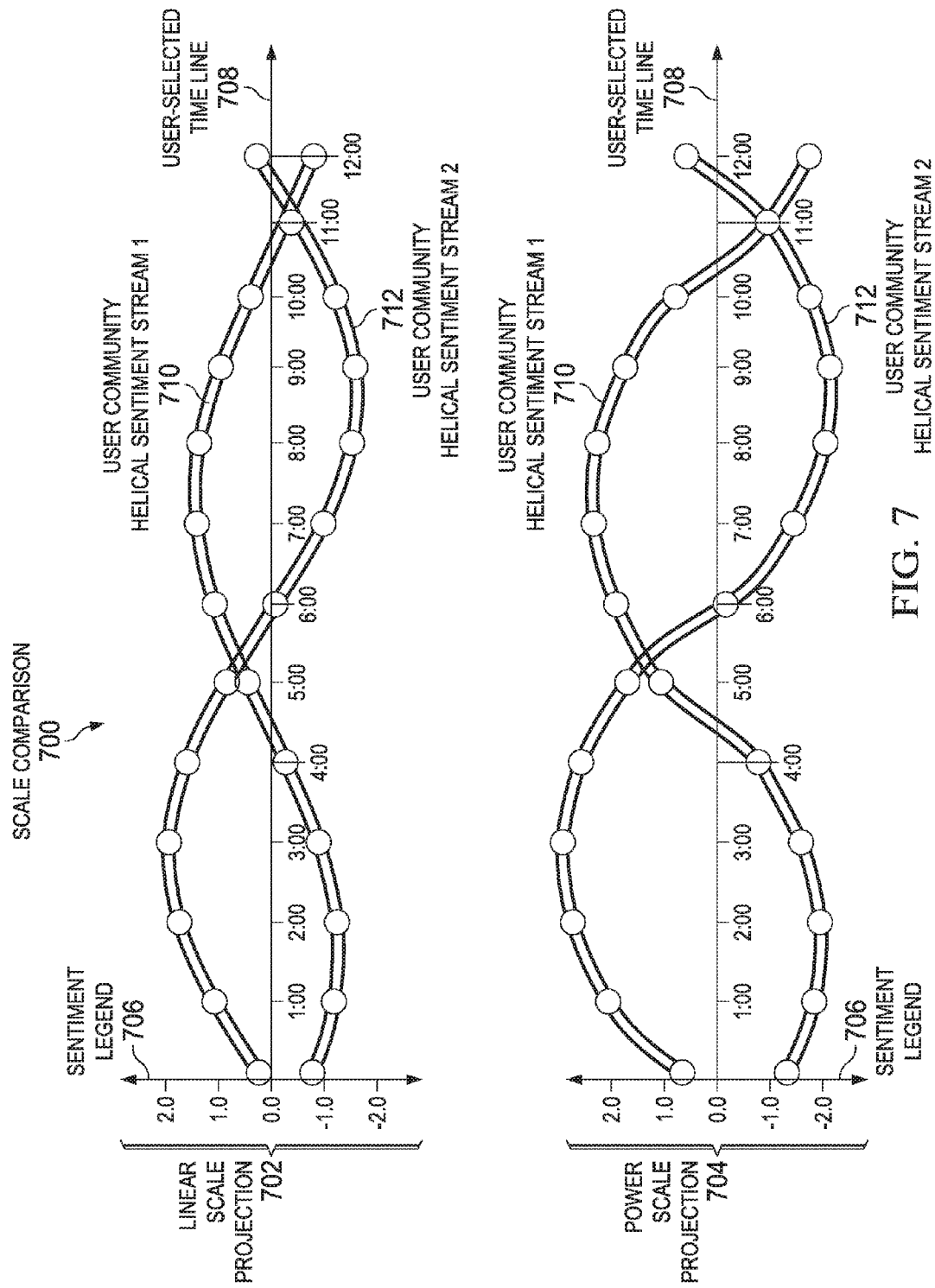
FIG. 7 is an illustration of an example of comparing linear and power scale projections in accordance with an illustrative embodiment.

With reference now to FIG. 7, an illustration of an example of comparing linear and power scale projections is depicted in accordance with an illustrative embodiment. Scale comparison 700 compares linear scale projection 702 and power scale projection 704. Linear scale projection 702 and power scale projection 704 include sentiment legend 706, user-selected time line 708, user community helical sentiment stream 1 710, and user community helical sentiment stream 2 712. Sentiment legend 706, user-selected time line 708, user community helical sentiment stream 1 710, and user community helical sentiment stream 2 712 may be, for example, y-axis sentiment legend line 442, x-axis user-selected time line 436, user community helical sentiment stream 1 426, and user community helical sentiment stream 2 428 in FIG. 4.

Linear scale projection 702 represents a visual conflict pattern without any distortion. Power scale projection 704 is a magnification of linear scale projection 702. In other words, power scale projection 704 enlarges small differences between user community helical sentiment stream 1 710 and user community helical sentiment stream 2 712 during the same period of time. In addition, power scale projection 704 also provides more screen space to show information or sentiment details between the two sentiment stream belts of the two different communities.

Figure 8B:
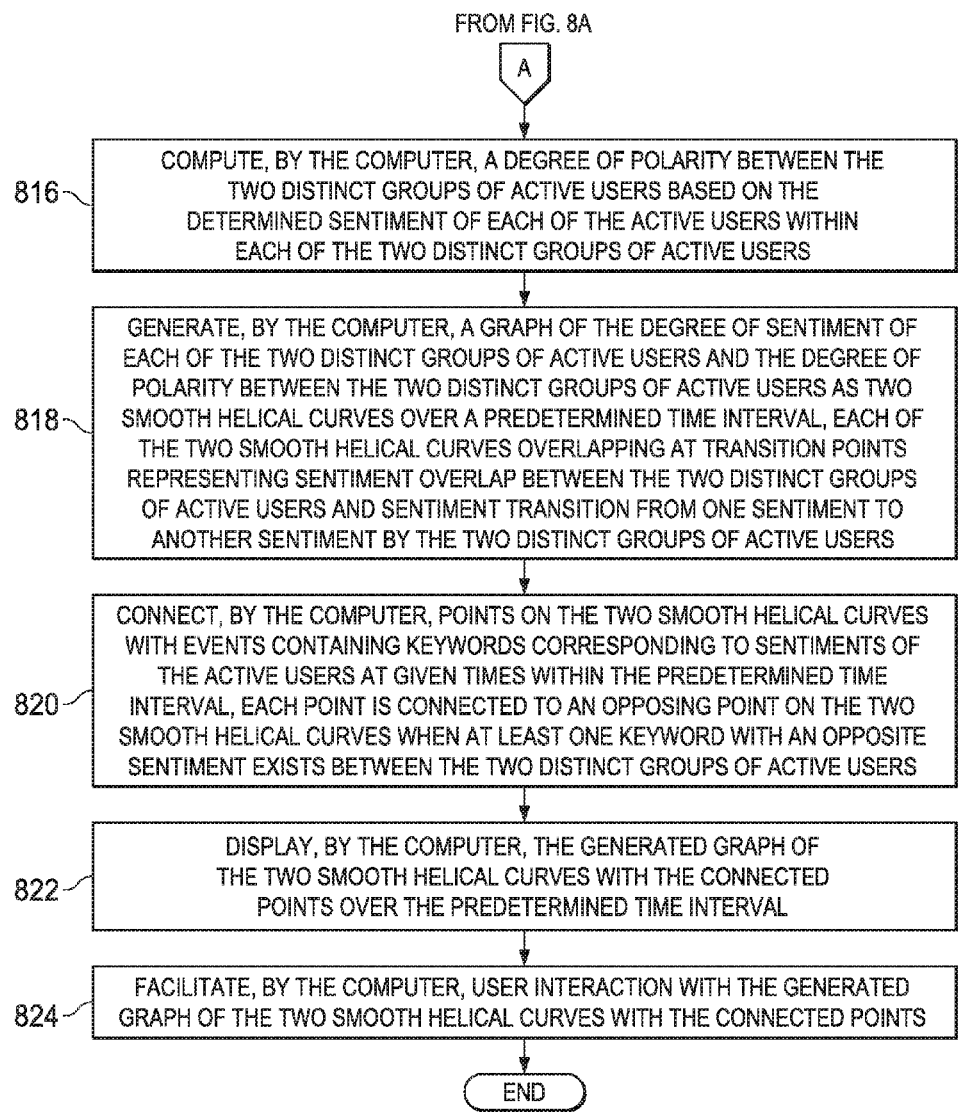

With reference now to FIGS. 8A-8B, a flowchart illustrating a process for visualizing social media conflict with regard to a particular topic is shown in accordance with an illustrative embodiment. The process shown in FIGS. 8A-8B may be implemented in a computer, such as, for example, data processing system 200 in FIG. 2.

The process begins when the computer collects textual messages by a set of human authors connected via a network regarding a particular topic (step 802). In addition, the computer selects active authors in the set of human authors authoring a number of textual messages regarding the particular topic more than a threshold number of textual messages (step 804). The computer also selects keywords that occur more than a threshold number of times within the textual messages regarding the particular topic (step 806).

Afterward, the computer computes a sentiment score for each of the keywords occurring more than the threshold number of times within the textual messages using a keyword co-occurrence graph (step 808). Then, the computer determines a sentiment of each of the active users based on the computed sentiment score of each of the selected keywords that are authored by a particular active user (step 810). Subsequently, the computer selects two distinct groups from the active users based on at least one of a relationship between the two distinct groups of active users and a determined degree of conflict between the two distinct groups of active users with regard to the particular topic (step 812).

Afterward, the computer determines a degree of sentiment of each of the two distinct groups of active users based on the determined sentiment of each of the active users within the two distinct groups of active users (step 814). Further, the computer computes a degree of polarity between the two distinct groups of active users based on the determined sentiment of each of the active users within each of the two distinct groups of active users (step 816). Then, the computer generates a graph of the degree of sentiment of each of the two distinct groups of active users and the degree of polarity between the two distinct groups of active users as two smooth helical curves over a predetermined time interval (step 818). Each of the two smooth helical curves overlap at transition points representing sentiment overlap between the two distinct groups of active users and sentiment transition from one sentiment to another sentiment by the two distinct groups of active users.

The computer also connects points on the two smooth helical curves with events containing keywords corresponding to sentiments of the active users at given times within the predetermined time interval (step 820). Each point is connected to an opposing point on the two smooth helical curves when at least one keyword with an opposite sentiment exists between the two distinct groups of active users. In addition, the computer displays the generated graph of the two smooth helical curves with the connected points over the predetermined time interval (step 822). Furthermore, the computer facilitates user interaction with the generated graph of the two smooth helical curves with the connected points (step 824). Thereafter, the process terminates.

Figure 9B:
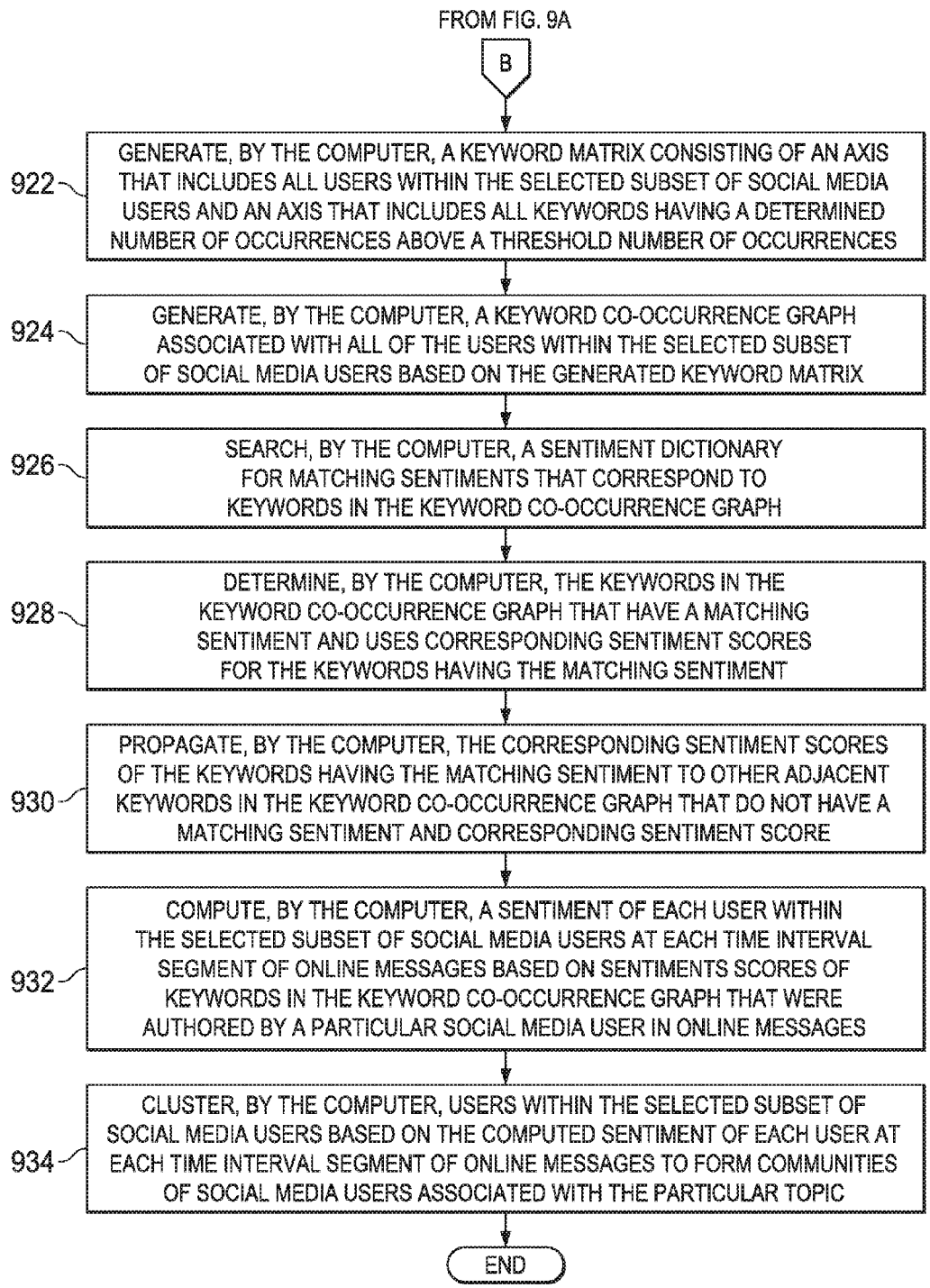

With reference now to FIGS. 9A-9B, a flowchart illustrating a process for processing online messages is shown in accordance with an illustrative embodiment. The process shown in FIGS. 9A-9B may be implemented in a computer, such as, for example, data processing system 200 in FIG. 2.

The process begins when the computer receives an input to process online messages on a social media website regarding a particular topic (step 902). The computer identifies a set of social media users associated with the particular topic on the social media website (step 904). In addition, computer determines a number of followers of each social media user in the set of social media users (step 906).

Afterward, the computer selects a subset of social media users within the set of social media users having a number of followers equal to or greater than a threshold number of followers (step 908). Then, the computer collects all of the online messages generated by the selected subset of social media users regarding the particular topic (step 910). The computer also segments all of the collected online messages generated by the selected subset of social media users regarding the particular topic based on a selected time interval (step 912).

Subsequently, the computer finds keywords associated with the particular topic within each time interval segment of online messages (step 914). Then, the computer ranks the keywords associated with the particular topic within each time interval segment of online messages based on a number of occurrences of each keyword within a particular time interval segment (step 916). The computer ranks the keywords within a time interval segment of online messages to determine the most relevant keywords within a particular time interval segment for inserting the most relevant keywords into an event box, such as event box 432 in FIG. 4, between sentiment streams of two different communities of social media users regarding a particular topic or category of discussion. Afterward, the computer aggregates all the keywords found within all of the time interval segments of online messages (step 918).

In addition, the computer determines a number of occurrences of each keyword in all online messages generated by each particular social media user within the selected subset of social media users regarding the particular topic (step 920). The computer also generates a keyword matrix consisting of an axis that includes all users within the selected subset of social media users and an axis that includes all keywords having a determined number of occurrences above a threshold number of occurrences (step 922). Further, the computer generates a keyword co-occurrence graph associated with all of the users within the selected subset of social media users based on the generated keyword matrix (step 924).

Then, the computer searches a sentiment dictionary for matching sentiments that correspond to keywords in the keyword co-occurrence graph (step 926). The computer determines the keywords in the keyword co-occurrence graph that have a matching sentiment and uses corresponding sentiment scores for the keywords having the matching sentiment (step 928). Afterward, the computer propagates the corresponding sentiment scores of the keywords having the matching sentiment to other adjacent keywords in the keyword co-occurrence graph that do not have a matching sentiment and corresponding sentiment score (step 930).

Subsequently, the computer computes a sentiment of each user within the selected subset of social media users at each time interval segment of online messages based on sentiments scores of keywords in the keyword co-occurrence graph that were authored by a particular social media user in online messages (step 932). The computer clusters users within the selected subset of social media users based on the computed sentiment of each user at each time interval segment of online messages to form communities of social media users associated with the particular topic (step 934). Thereafter, the process terminates.

Figure 10A:
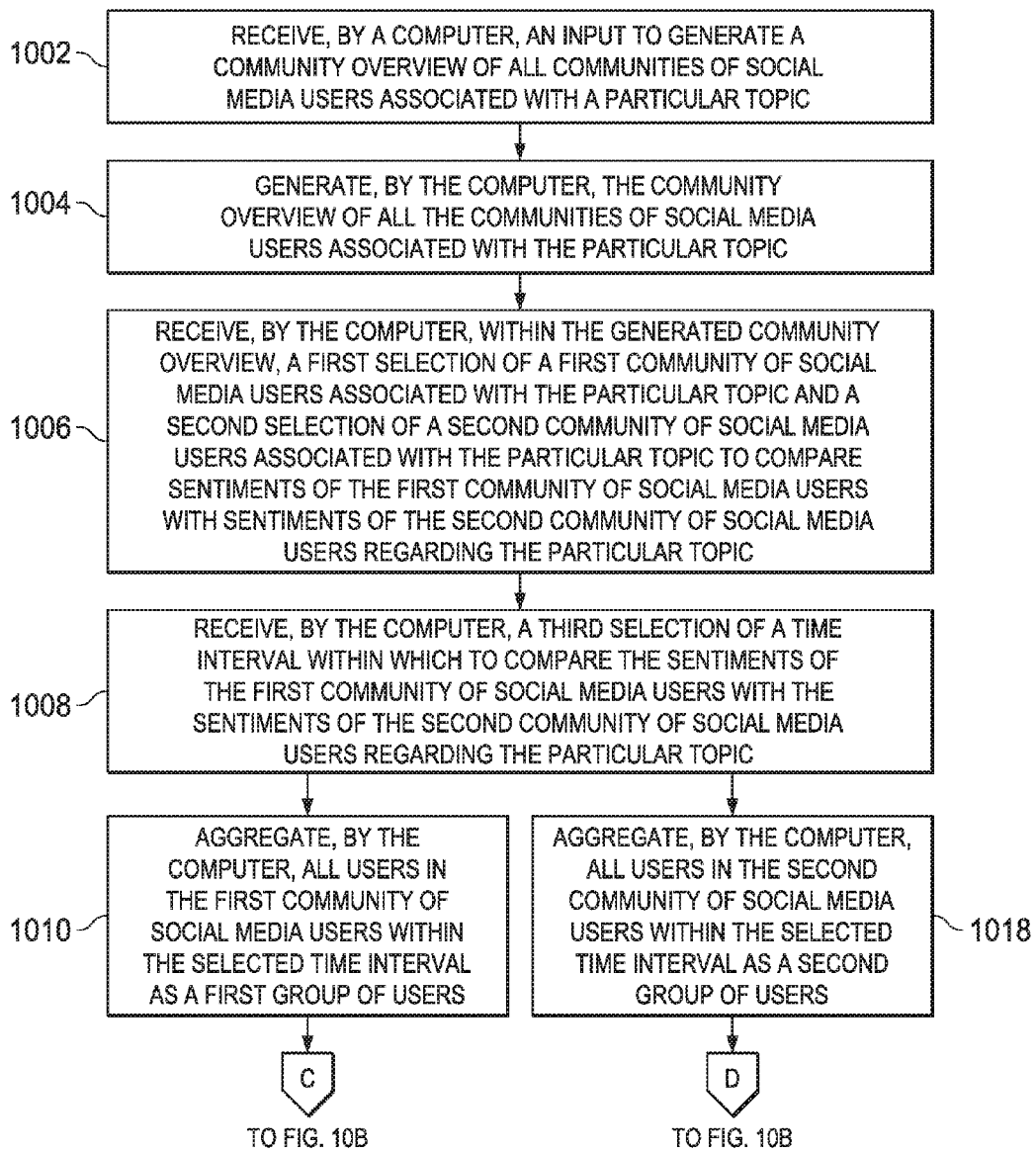
FIGS. 10A-10B are a flowchart illustrating a process for generating a social media conflict visualization graph in accordance with an illustrative embodiment.
Figure 10B:
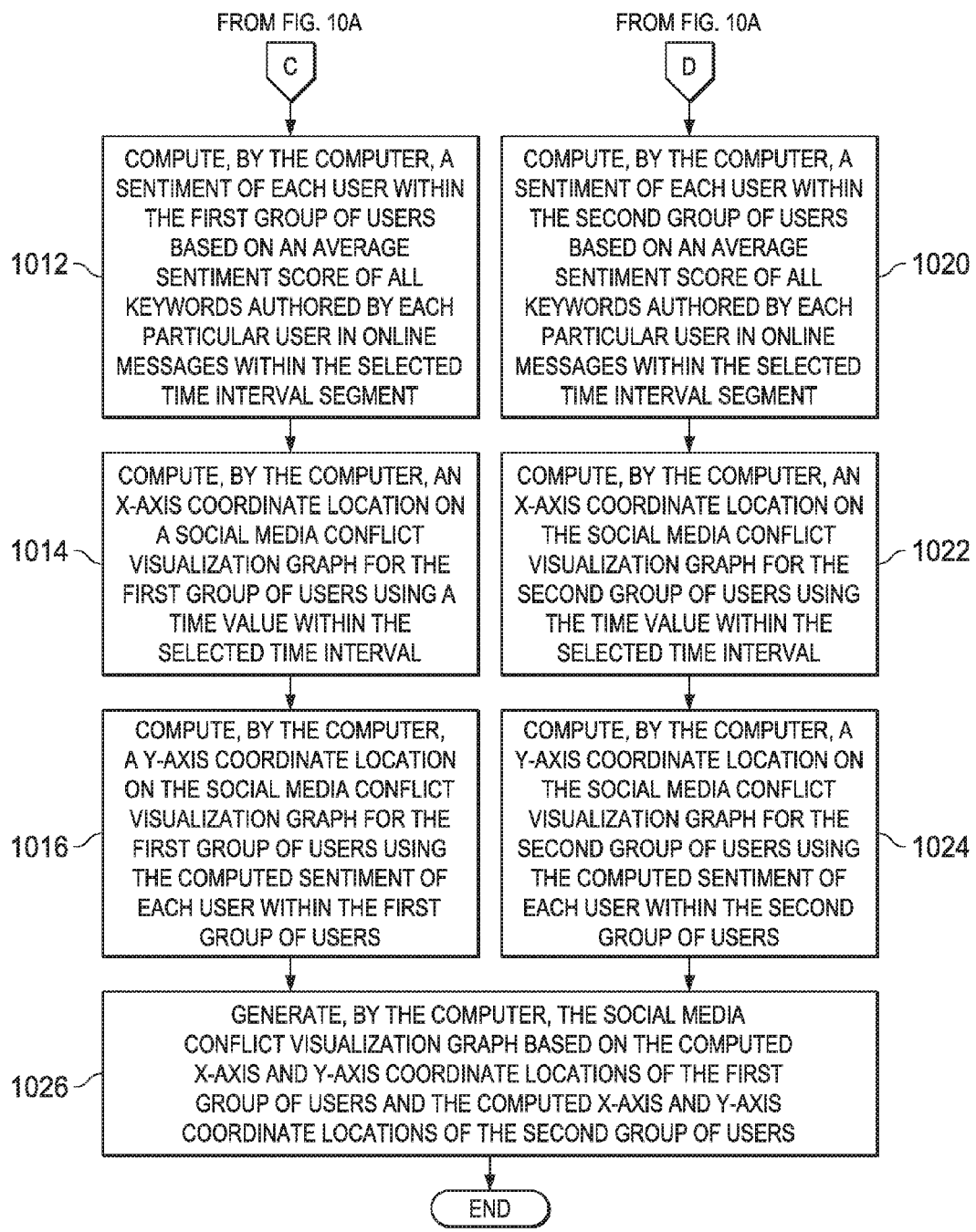

With reference now to FIGS. 10A-10B, a flowchart illustrating a process for generating a social media conflict visualization graph is shown in accordance with an illustrative embodiment. The process shown in FIGS. 10A-10B may be implemented in a computer, such as, for example, data processing system 200 in FIG. 2.

The process begins when the computer receives an input to generate a community overview of all communities of social media users associated with a particular topic (step 1002). Then, the computer generates the community overview of all the communities of social media users associated with the particular topic (step 1004). Afterward, the computer receives within the generated community overview a first selection of a first community of social media users associated with the particular topic and a second selection of a second community of social media users associated with the particular topic to compare sentiments of the first community of social media users with sentiments of the second community of social media users regarding the particular topic (step 1006). In addition, the computer receives a third selection of a time interval within which to compare the sentiments of the first community of social media users with the sentiments of the second community of social media users regarding the particular topic (step 1008).

Subsequently, the computer aggregates all users in the first community of social media users within the selected time interval as a first group of users (step 1010). Further, the computer computes a sentiment of each user within the first group of users based on an average sentiment score of all keywords authored by each particular user in online messages within the selected time interval segment (step 1012). Then, the computer computes an x-axis coordinate location on a social media conflict visualization graph for the first group of users using a time value within the selected time interval (step 1014). The computer also computes a y-axis coordinate location on the social media conflict visualization graph for the first group of users using the computed sentiment of each user within the first group of users (step 1016).

In addition, the computer aggregates all users in the second community of social media users within the selected time interval as a second group of users (step 1018). Further, the computer computes a sentiment of each user within the second group of users based on an average sentiment score of all keywords authored by each particular user in online messages within the selected time interval segment (step 1020). Then, the computer computes an x-axis coordinate location on the social media conflict visualization graph for the second group of users using the time value within the selected time interval (step 1022). The computer also computes a y-axis coordinate location on the social media conflict visualization graph for the second group of users using the computed sentiment of each user within the second group of users (step 1024). It should be noted that the computer may execute steps 1010-1016 in parallel with steps 1018-1024.

Afterward, the computer generates the social media conflict visualization graph based on the computed x-axis and y-axis coordinate locations of the first group of users and the computed x-axis and y-axis coordinate locations of the second group of users (step 1026). Thereafter, the process terminates.

Thus, illustrative embodiments of the present invention provide a computer system and computer program product for visualizing social media conflict. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for visualizing social media conflict, the computer-implemented method comprising:

selecting, by a computer, active users in a set of human users authoring a number of textual messages regarding a particular topic more than a threshold number of textual messages;

selecting, by the computer, keywords that occur more than a threshold number of times within the number of textual messages regarding the particular topic;

computing, by the computer, a sentiment score for each of the keywords occurring more than the threshold number of times within the number of textual messages regarding the particular topic using a keyword co-occurrence graph;

determining, by the computer, a sentiment of each of the active users based on the computed sentiment score of each of the selected keywords that are authored by a particular active user;

selecting, by the computer, two distinct groups from the active users based on at least one of a relationship between the two distinct groups of active users and a determined degree of conflict between the two distinct groups of active users with regard to the particular topic;

determining, by the computer, a degree of sentiment of each of the two distinct groups of active users based on the determined sentiment of each of the active users within the two distinct groups of active users;

computing, by the computer, a degree of polarity between the two distinct groups of active users based on the determined sentiment of each of the active users within each of the two distinct groups of active users;

displaying, by the computer, a graph, wherein the graph is the degree of sentiment of each of the two distinct groups of active users and the degree of polarity between the two distinct groups of active users; and displaying, by the computer, a summary of the degree of conflict between the two distinct groups of active users with regard to the particular topic based on the graph.

2. The computer-implemented method of claim 1, further comprising:

generating, by the computer, the graph of the degree of sentiment of each of the two distinct groups of active users and the degree of polarity between the two distinct groups of active users as two smooth helical curves over a predetermined time interval, each of the two smooth helical curves overlapping at transition points representing sentiment overlap between the two distinct groups of active users and sentiment transition from one sentiment to another sentiment by the two distinct groups of active users.

3. The computer-implemented method of claim 2, further comprising:
connecting, by the computer, points on the two smooth helical curves with events containing keywords corresponding to sentiments of the active users at given times within the predetermined time interval.

4. The computer-implemented method of claim 3, further comprising:
displaying, by the computer, the generated graph of the two smooth helical curves with the connected points over the predetermined time interval; and
facilitating, by the computer, user interaction with the generated graph of the two smooth helical curves with the connected points.

5. The computer-implemented method of claim 1, further comprising:
ranking, by the computer, the keywords associated with the particular topic within time interval segments of online messages based on a number of occurrences of each keyword within a particular time interval segment to determine relevant keywords within the particular time interval segment, wherein the computer inserts the relevant keywords within the particular time interval segment into an event box located between sentiment streams of two different communities of social media users regarding the particular topic.

6. The computer-implemented method of claim 5, further comprising:
searching, by the computer, a sentiment dictionary for matching sentiments that correspond to keywords located in the keyword co-occurrence graph;
determining, by the computer, the keywords in the keyword co-occurrence graph that have a matching sentiment and using corresponding sentiment scores for the keywords having the matching sentiment;
propagating, by the computer, the corresponding sentiment scores of the keywords having the matching sentiment to adjacent keywords in the keyword co-occurrence graph that do not have a matching sentiment and corresponding sentiment score; and
computing, by the computer, the sentiment of each of the active users at each time interval segment of online messages based on sentiments scores of keywords in the keyword co-occurrence graph that were authored by a particular active user.

7. The computer-implemented method of claim 2, further comprising:
computing, by the computer, a first x-axis coordinate location on the graph for a first group of active users using a time value within the predetermined time interval;
computing, by the computer, a first y-axis coordinate location on the graph for the first group of active users using the determined sentiment of each active user within the first group of active users;
computing, by the computer, a second x-axis coordinate location on the graph for a second group of active users using the time value within the predetermined time interval;
computing, by the computer, a second y-axis coordinate location on the graph for the second group of active users using the determined sentiment of each active user within the second group of active users; and
generating, by the computer, the graph based on the computed first x-axis and first y-axis coordinate locations of the first group of active users and the computed second x-axis and second y-axis coordinate locations of the second group of active users.

8. A computer system for visualizing social media conflict, the computer system comprising:
a bus system;
a storage device connected to the bus system, wherein the storage device stores computer readable program code; and
a processor unit connected to the bus system, wherein the processor unit executes the computer readable program code to:
select active users in a set of human users authoring a number of textual messages regarding a particular topic more than a threshold number of textual messages;
select keywords that occur more than a threshold number of times within the number of textual messages regarding the particular topic;
compute a sentiment score for each of the keywords occurring more than the threshold number of times within the number of textual messages regarding the particular topic using a keyword co-occurrence graph;
determine a sentiment of each of the active users based on the computed sentiment score of each of the selected keywords that are authored by a particular active user;
select two distinct groups from the active users based on at least one of a relationship between the two distinct groups of active users and a determined degree of conflict between the two distinct groups of active users with regard to the particular topic;
determine a degree of sentiment of each of the two distinct groups of active users based on the determined sentiment of each of the active users within the two distinct groups of active users;
compute a degree of polarity between the two distinct groups of active users based on the determined sentiment of each of the active users within each of the two distinct groups of active users;
display a graph, wherein the graph is the degree of sentiment of each of the two distinct groups of active users and the degree of polarity between the two distinct groups of active users; and
display a summary of the degree of conflict between the two distinct groups of active users with regard to the particular topic based on the graph.

9. The computer system of claim 8, where the processor unit further executes the computer readable program code to:
generate the graph of the degree of sentiment of each of the two distinct groups of active users and the degree of polarity between the two distinct groups of active users as two smooth helical curves over a predetermined time interval, each of the two smooth helical curves overlapping at transition points representing sentiment overlap between the two distinct groups of active users and sentiment transition from one sentiment to another sentiment by the two distinct groups of active users.

10. The computer system of claim 9, where the processor unit further executes the computer readable program code to:
connect points on the two smooth helical curves with events containing keywords corresponding to sentiments of the active users at given times within the predetermined time interval.

11. The computer system of claim 10, where the processor unit further executes the computer readable program code to:
   display the generated graph of the two smooth helical curves with the connected points over the predetermined time interval; and
   facilitate user interaction with the generated graph of the two smooth helical curves with the connected points.

12. The computer system of claim 8, where the processor unit further executes the computer readable program code to:
   rank the keywords associated with the particular topic within time interval segments of online messages based on a number of occurrences of each keyword within a particular time interval segment to determine relevant keywords within the particular time interval segment, wherein the computer inserts the relevant keywords within the particular time interval segment into an event box located between sentiment streams of two different communities of social media users regarding the particular topic.

13. The computer system of claim 12, where the processor unit further executes the computer readable program code to:
   search a sentiment dictionary for matching sentiments that correspond to keywords located in the keyword co-occurrence graph;
   determine the keywords in the keyword co-occurrence graph that have a matching sentiment and using corresponding sentiment scores for the keywords having the matching sentiment;
   propagate the corresponding sentiment scores of the keywords having the matching sentiment to adjacent keywords in the keyword co-occurrence graph that do not have a matching sentiment and corresponding sentiment score; and
   compute the sentiment of each of the active users at each time interval segment of online messages based on sentiments scores of keywords in the keyword co-occurrence graph that were authored by a particular active user.

14. A computer program product stored on a computer readable storage medium having computer readable program code encoded thereon that is executable by a computer for visualizing social media conflict, the computer program product comprising:
   computer readable program code to select active users in a set of human users authoring a number of textual messages regarding a particular topic more than a threshold number of textual messages;
   computer readable program code to select keywords that occur more than a threshold number of times within the number of textual messages regarding the particular topic;
   computer readable program code to compute a sentiment score for each of the keywords occurring more than the threshold number of times within the number of textual messages regarding the particular topic using a keyword co-occurrence graph;
   computer readable program code to determine a sentiment of each of the active users based on the computed sentiment score of each of the selected keywords that are authored by a particular active user;
   computer readable program code to select two distinct groups from the active users based on at least one of a relationship between the two distinct groups of active users and a determined degree of conflict between the two distinct groups of active users with regard to the particular topic;
   computer readable program code to determine a degree of sentiment of each of the two distinct groups of active users based on the determined sentiment of each of the active users within the two distinct groups of active users;
   computer readable program code to compute a degree of polarity between the two distinct groups of active users based on the determined sentiment of each of the active users within each of the two distinct groups of active users;
   computer readable program code to display a graph, wherein the graph is the degree of sentiment of each of the two distinct groups of active users and the degree of polarity between the two distinct groups of active users; and
   computer readable program code to display a summary of the degree of conflict between the two distinct groups of active users with regard to the particular topic based on the graph.

15. The computer program product of claim 14, further comprising:
   computer readable program code to generate the graph of the degree of sentiment of each of the two distinct groups of active users and the degree of polarity between the two distinct groups of active users as two smooth helical curves over a predetermined time interval, each of the two smooth helical curves overlapping at transition points representing sentiment overlap between the two distinct groups of active users and sentiment transition from one sentiment to another sentiment by the two distinct groups of active users.

16. The computer program product of claim 15, further comprising:
   computer readable program code to connect points on the two smooth helical curves with events containing keywords corresponding to sentiments of the active users at given times within the predetermined time interval.

17. The computer program product of claim 16, further comprising:
   computer readable program code to display the generated graph of the two smooth helical curves with the connected points over the predetermined time interval; and
   computer readable program code to facilitate user interaction with the generated graph of the two smooth helical curves with the connected points.

18. The computer program product of claim 14, further comprising:
   computer readable program code to rank the keywords associated with the particular topic within time interval segments of online messages based on a number of occurrences of each keyword within a particular time interval segment to determine relevant keywords within the particular time interval segment, wherein the computer inserts the relevant keywords within the particular time interval segment into an event box located between sentiment streams of two different communities of social media users regarding the particular topic.

19. The computer program product of claim 18, further comprising:
   computer readable program code to search a sentiment dictionary for matching sentiments that correspond to keywords located in the keyword co-occurrence graph;

computer readable program code to determine the keywords in the keyword co-occurrence graph that have a matching sentiment and using corresponding sentiment scores for the keywords having the matching sentiment;

computer readable program code to propagate the corresponding sentiment scores of the keywords having the matching sentiment to adjacent keywords in the keyword co-occurrence graph that do not have a matching sentiment and corresponding sentiment score; and computer readable program code to compute the sentiment of each of the active users at each time interval segment of online messages based on sentiments scores of keywords in the keyword co-occurrence graph that were authored by a particular active user.

20. The computer program product of claim 15, further comprising:

computer readable program code to compute a first x-axis coordinate location on the graph for a first group of active users using a time value within the predetermined time interval;

computer readable program code to compute a first y-axis coordinate location on the graph for the first group of active users using the determined sentiment of each active user within the first group of active users;

computer readable program code to compute a second x-axis coordinate location on the graph for a second group of active users using the time value within the predetermined time interval;

computer readable program code to compute a second y-axis coordinate location on the graph for the second group of active users using the determined sentiment of each active user within the second group of active users; and computer readable program code to generate the graph based on the computed first x-axis and first y-axis coordinate locations of the first group of active users and the computed second x-axis and second y-axis coordinate locations of the second group of active users.

\* \* \* \* \*